(12) United States Patent
Fliearman et al.

(10) Patent No.: US 11,884,150 B2
(45) Date of Patent: Jan. 30, 2024

(54) TANDEM WHEEL ASSEMBLY WITH WHEEL END BRAKE ASSEMBLY

(71) Applicant: Deere & Company, Moline, IL (US)

(72) Inventors: Steven R. Fliearman, Coffeyville, KS (US); Prashant Shinde, Pune (IN); Galen R. Love, Independence, KS (US)

(73) Assignee: DEERE & COMPANY, Moline, IL (US)

(*) Notice: Subject to any disclaimer, the term of this patent is extended or adjusted under 35 U.S.C. 154(b) by 181 days.

(21) Appl. No.: 17/236,126

(22) Filed: Apr. 21, 2021

(65) Prior Publication Data

US 2022/0340005 A1    Oct. 27, 2022

(51) Int. Cl.
| | |
|---|---|
| *B60K 17/36* | (2006.01) |
| *B60K 17/342* | (2006.01) |
| *B60G 21/00* | (2006.01) |
| *B60K 17/04* | (2006.01) |

(52) U.S. Cl.
CPC ............ *B60K 17/36* (2013.01); *B60G 21/002* (2013.01); *B60K 17/046* (2013.01)

(58) Field of Classification Search
CPC .............................. B60K 17/342; B60K 17/36
See application file for complete search history.

(56) References Cited

U.S. PATENT DOCUMENTS

| | | | |
|---|---|---|---|
| 2,374,196 A | 2/1942 | Harbers | |
| 2,819,910 A | 1/1958 | Walter | |
| 3,166,142 A | 1/1965 | Frazier | |
| 3,198,551 A * | 8/1965 | Garner | B60K 17/342 180/24.06 |
| 3,450,221 A | 6/1969 | Nelson | |
| 3,786,888 A | 1/1974 | Nelson | |
| 3,792,871 A | 2/1974 | Chalmers | |

(Continued)

FOREIGN PATENT DOCUMENTS

| | | | | |
|---|---|---|---|---|
| CN | 201192987 Y | | 2/2009 | |
| CN | 110217103 A | * | 9/2019 | .............. B60K 1/00 |

(Continued)

OTHER PUBLICATIONS

USPTO Non-Final Office Action issued in utility U.S. Appl. No. 17/075,144 dated Oct. 18, 2021.

(Continued)

*Primary Examiner* — Barry Gooden, Jr.
(74) *Attorney, Agent, or Firm* — KLINTWORTH & ROZENBLAT IP LLP

(57) ABSTRACT

A tandem wheel assembly for a work vehicle includes a tandem wheel housing, a center drive member rotatably disposed within the housing, first and second wheel end assemblies, a coupler between each wheel end drive member and the center drive member, and a brake assembly. Each wheel end assembly includes an input shaft, a wheel end drive member mounted thereon, a wheel end gear train coupled to the input shaft, an output shaft coupled to the wheel end gear train, and a wheel end hub coupled to the output shaft for supporting one of the wheels. The brake assembly is coupled to the tandem wheel housing and to the input shaft or the output shaft of at least one of the first wheel end assembly or the second wheel end assembly and reduces the amount of backlash.

18 Claims, 12 Drawing Sheets

(56) References Cited

U.S. PATENT DOCUMENTS

| | | | |
|---|---|---|---|
| 3,976,154 | A | 8/1976 | Clark et al. |
| 4,064,956 | A | 12/1977 | Wildey |
| 4,237,994 | A * | 12/1980 | McColl ................ B60G 21/04 |
| | | | 180/24 |
| 4,278,141 | A | 7/1981 | Oswald et al. |
| 4,407,381 | A | 10/1983 | Oswald et al. |
| 4,535,860 | A | 8/1985 | Waggoner |
| 4,560,018 | A | 12/1985 | Satzler |
| 4,646,880 | A | 3/1987 | Logan |
| 5,016,905 | A | 5/1991 | Licari |
| 5,337,849 | A | 8/1994 | Eavenson, Sr. et al. |
| 5,417,297 | A | 5/1995 | Auer |
| 6,036,611 | A | 3/2000 | Bigo et al. |
| 6,112,843 | A | 9/2000 | Wilcox et al. |
| 6,200,240 | B1 | 3/2001 | Oates |
| 6,416,136 | B1 | 7/2002 | Smith |
| 7,124,853 | B1 | 10/2006 | Kole, Jr. |
| 7,229,094 | B2 | 6/2007 | Miller et al. |
| 7,296,642 | B1 | 11/2007 | DeWald |
| 7,832,509 | B2 | 11/2010 | Thomson et al. |
| 7,954,574 | B2 | 6/2011 | Schoon |
| 8,262,125 | B2 | 9/2012 | Sergison et al. |
| 8,733,489 | B2 * | 5/2014 | Heine ............ B60W 30/18109 |
| | | | 180/170 |
| 9,242,556 | B2 | 1/2016 | Ziech et al. |
| 9,358,880 | B2 | 6/2016 | Bindl |
| 9,868,322 | B1 | 1/2018 | Varela |
| 10,106,010 | B2 | 10/2018 | Fliearman |
| 10,107,363 | B2 * | 10/2018 | Fliearman ................ F16H 61/30 |
| 10,207,580 | B2 * | 2/2019 | Long ................ F16H 3/663 |
| 10,434,836 | B2 | 10/2019 | Fliearman |
| 11,376,956 | B2 * | 7/2022 | Fliearman ............ B60G 13/04 |
| 2005/0045390 | A1 | 3/2005 | Lamela et al. |
| 2005/0279563 | A1 | 12/2005 | Peterson |
| 2006/0154776 | A1 | 7/2006 | Claussen et al. |
| 2008/0230284 | A1 | 9/2008 | Schoon |
| 2010/0012401 | A1 | 1/2010 | Thomson et al. |
| 2014/0145410 | A1 | 5/2014 | Kaufman et al. |
| 2015/0165898 | A1 | 6/2015 | Bindl |
| 2016/0178041 | A1 * | 6/2016 | Hagman ............ B60K 17/046 |
| | | | 475/204 |
| 2016/0263987 | A1 | 9/2016 | Brownell et al. |
| 2017/0050517 | A1 | 2/2017 | Higuchi |
| 2017/0080752 | A1 | 3/2017 | Varela et al. |
| 2018/0065439 | A1 | 3/2018 | Fliearman |
| 2018/0065440 | A1 | 3/2018 | Fliearman |
| 2018/0312060 | A1 | 11/2018 | Varela |
| 2019/0001772 | A1 | 1/2019 | Dyna |
| 2019/0331173 | A1 | 10/2019 | Eschenburg et al. |
| 2020/0400226 | A1 | 12/2020 | Shinde et al. |
| 2021/0323616 | A1 | 10/2021 | Fliearman et al. |
| 2022/0016975 | A1 | 1/2022 | Fliearman et al. |
| 2022/0111726 | A1 | 4/2022 | Fliearman et al. |
| 2022/0118848 | A1 | 4/2022 | Fliearman et al. |

FOREIGN PATENT DOCUMENTS

| | | | |
|---|---|---|---|
| DE | 19681259 C2 | 6/2000 | |
| DE | 19908958 A1 * | 9/2000 | ............ B60K 17/36 |
| DE | 102021209187 A1 | 4/2022 | |
| GB | 567097 A | 1/1945 | |
| GB | 1576166 A * | 10/1980 | ............ B60B 37/00 |
| WO | 2012123630 A1 | 9/2012 | |
| WO | WO2016170410 A1 | 10/2016 | |

OTHER PUBLICATIONS

German Search Report issued in application No. DE102022202294.7 dated Oct. 13, 2022 (10 pages).
German Search Report issued in application No. DE102021207440.5 dated Mar. 17, 2022 (17 pages).
USPTO Non-Final Office Action issued in utility U.S. Appl. No. 17/068,159 dated Oct. 7, 2022.
USPTO Non-Final Office Action issued in utility U.S. Appl. No. 17/186,516 dated Oct. 14, 2022.
German Search Report issued in application No. DE102021203728.3 dated Feb. 14, 2022 (06 pages).
Search Report issued in application No. DE102021209187.3 dated Mar. 29, 2022 (17 pages).
European Extended Search Report for application No. 17184539 dated Jan. 10, 2018.
USPTO Ex Parte Quayle Action for U.S. Appl. No. 15/255,860 issued Apr. 5, 2018.
John Deere, 317 and 320 Skid Steers, Introduction and Customer Information, T198465A A.1, Manufactured 2004-2009.
John Deere, 317 and 320 Skid Steers PC9347 Parts List—50 Power Train, undated, admitted prior art.
John Deere, Drive Chains and Sprockets—ST119001, 317 and 320 Skid Steers PC9347—50 Power Train Parts List, undated, admitted prior art.
John Deere, Axle ST119002, 317 and 320 Skid Steers PC9347—50 Power Train Parts List, undated, admitted prior art.
John Deere, Image of Fixed Axle Drive, undated, admitted prior art.
Tigercat, H-Series Skidders, 620H | 630H | 632H | 625H | 635H Brochure © 2001-2020.
Tigercat Bogie Skidder Image, undated admitted prior art.
NAF Bogie Axles For Your Heavy Duty Playgrounds Brochure, 2019.
USPTO Non-Final Office Action issued in Utility U.S. Appl. No. 16/852,117 dated Apr. 20, 2023.
USPTO Final Office Action issued in Utility U.S. Appl. No. 17/068,159 dated Apr. 27, 2023.
USPTO Final Office Action issued in Utility U.S. Appl. No. 16/852,117 dated Sep. 21, 2023.

* cited by examiner

TANDEM WHEEL ASSEMBLY WITH WHEEL END BRAKE ASSEMBLY

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and, more particularly, to tandem wheel assemblies for work vehicles.

BACKGROUND OF THE DISCLOSURE

Work vehicles, such as used in forestry, construction, agriculture, mining and other industries, may utilize tandem wheel assemblies (also known as bogie axles) to support significant loads across four or more ground-engaging or track wheels utilizing a single axle that allows the wheels pivot together to maintain ground contact over varying terrain without significantly shifting other areas of the work vehicle, including an operator cabin and a work implement (e.g., a crane). Such tandem wheel assemblies may also be driven (e.g., from the work vehicle powertrain through a transmission or may be powered themselves). One work vehicle that often utilizes a tandem wheel assembly is a forwarder used in tree harvesting operations. Applications may require the forwarder to deliver high-torque, and possibly low-speed, power to the ground-engaging wheels, which is achieved through a high-ratio gear reduction to the wheels. Different applications may be suitable for different forwarders or other machine platforms with different load-carrying capabilities.

SUMMARY OF THE DISCLOSURE

This disclosure provides a work vehicle tandem wheel assembly with a wheel end brake assembly.

In one aspect the disclosure provides a tandem wheel assembly for a work vehicle having a chassis and wheels. The tandem wheel assembly includes a tandem wheel housing defining a center opening extending along a pivot axis and first and second wheel end openings extending along associated wheel end axes, a center drive member disposed within the tandem wheel housing and rotatable with respect to the tandem wheel housing around the pivot axis, first and second wheel end assemblies disposed at one of the wheel end openings, a coupler between each wheel end drive member and the center drive member, and a brake assembly. The tandem wheel housing is pivotally mounted to the chassis about the pivot axis, the pivot axis and the wheel end axes being parallel to each other. Each wheel end axis is spaced longitudinally on opposite sides of the pivot axis. Each wheel end assembly includes an input shaft mounted for rotation within the tandem wheel housing, a wheel end drive member mounted on the input shaft for rotation therewith, a wheel end gear train coupled to the input shaft, an output shaft coupled to the wheel end gear train and rotatable along the wheel end axis, and a wheel end hub coupled to the output shaft for supporting one of the wheels. Each wheel end drive member is driven by the center drive member. The brake assembly is coupled to the tandem wheel housing and to the input shaft or the output shaft of at least one of the first wheel end assembly or the second wheel end assembly.

In another aspect, the disclosure provides a tandem wheel assembly for a work vehicle having a chassis and wheels. The tandem wheel assembly includes a tandem wheel housing defining a center opening extending along a pivot axis and wheel end openings extending along associated wheel end axes, a center drive member disposed within the tandem wheel housing and rotatable with respect to the tandem wheel housing around the pivot axis, first and second wheel end assemblies disposed at one of the wheel end openings, a coupler between each wheel end drive member and the center drive member, wherein each wheel end drive member is driven by the center drive member, and a brake assembly. The tandem wheel housing is pivotally mounted to the chassis about the pivot axis, the pivot axis and the wheel end axes being parallel to each other. Each wheel end axis is spaced longitudinally on opposite sides of the pivot axis. The tandem wheel housing has an exterior inboard wall configured to be closer to a fore-aft centerline of the work vehicle when mounted to the work vehicle. Each wheel end assembly includes an input shaft mounted for rotation within the tandem wheel housing, a wheel end drive member mounted on the input shaft for rotation therewith, a wheel end gear train coupled to the input shaft, an output shaft coupled to the wheel end gear train and rotatable along the wheel end axis, and a wheel end hub coupled to the output shaft for supporting one of the wheels. The brake assembly is coupled to the tandem wheel housing and to the input shaft of at least one of the first wheel end assembly or the second wheel end assembly at the input shaft inboard of the exterior inboard wall of the tandem wheel housing.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
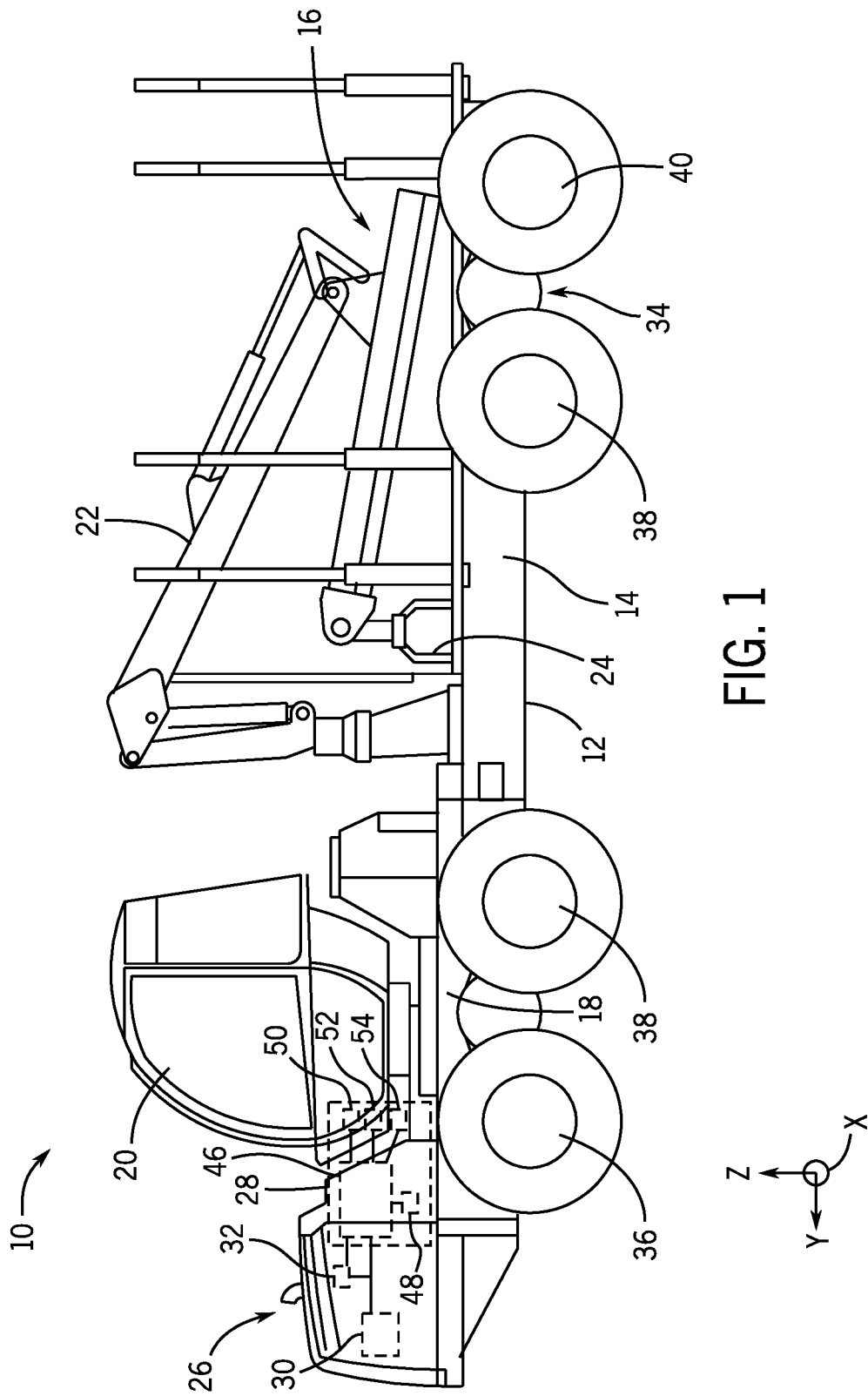
FIG. 1 is a simplified side view of a work vehicle in the form of a tree harvesting forwarder with a tandem wheel assembly according to example embodiments of the present disclosure.

The following describes one or more example embodiments of the disclosed tandem wheel assembly, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "longitudinal," "inner," "outer," "radial," "axial," "circumferential," "lateral," and "transverse" may be used. Such terms are defined, at least in part, with respect to a wheel axle, pivot axis, and/or a work vehicle. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached. In other examples, the components referenced by those terms may be reversed in accordance with the present disclosure.

OVERVIEW

Work vehicles, such as tree harvesting forwarders, typically include components such as a chassis, power train (e.g., engine and drivetrain), suspension, and work implements (e.g., cranes) that implement tasks over a variety of terrain and conditions. Typically, the work vehicle may perform tasks that require consistent work implement positioning (e.g., crane grasping and moving felled trees). In the case of a forwarder, the work implement is typically a crane, which, during operation, lifts large felled trees onto a load space of the forwarder. The wheel axle region may support significant static weight loads from on-board components (e.g., engine, transmission, axle, work implements, etc.) and encounter significant operating loads (e.g., via attached work implements and shocks/loads through the wheels and suspension). Therefore, the work vehicle must accommodate varying terrain, static loads, and operating loads resulting from the work tasks while maintaining the desired implement positioning. A tandem wheel assembly may accommodate such loads or changes during operation of the work implements with a brake assembly that maintains the work vehicle in a set location during operation. Such work vehicles use an intelligent control which knows where a crane of the work vehicle is positioned so that the felled tree can be moved. The exact location of the machine relative to the objects must be known for proper functioning of the implement. In this regard, it is undesirable for the work vehicle to move during loading of the felled trees. Such movement can result from backlash in a drive train between wheels of the work vehicle and a brake assembly of the work vehicle. Any backlash between these components represents movement of the of the work vehicle as the crane is moved.

Such work vehicle may have a tandem wheel assembly that mounts pairs of wheels which are driven by a differential on the work vehicle. A shaft extends from the differential to each of a pair of tandem wheel housings, each tandem wheel housing mounting a pair of wheels. In each tandem wheel housing, the shaft rotates a center drive member, which may be a sprocket, mounted for co-rotation with the shaft, which in turn, rotates couplers, which may be chains or gears, connecting the center drive member to front and rear wheel end assemblies which mount the wheels of the work vehicle. Each wheel end assembly includes shaft mounted wheel end gear trains therein coupled to the couplers. Each gear-on-gear connection, sprocket-on-gear connection, and each chain-on-sprocket create backlash. In addition, when chains are used as the couplers, the chain droops which contributes to backlash. Since the sprocket, chains, and the gears are in series, the backlash is additive. The disclosure provides a brake assembly which minimizes the backlash by placing the brake assembly on at least one of the wheel end assemblies, instead of at the shaft which extends from the differential. Each includes an input shaft mounted for rotation within the tandem wheel housing, a wheel end drive member mounted on the input shaft for rotation therewith, a wheel end gear train coupled to the input shaft, an output shaft coupled to the wheel end gear train and rotatable along the wheel end axis, and a wheel end hub coupled to the output shaft for supporting one of the wheels. The brake assembly is coupled to the tandem wheel housing and to the input shaft or the output shaft of at least one of the first and second wheel end assemblies. Since the brake assembly is on at least one of the wheel end assemblies, the additive backlash which results from the connection of the center drive member to the coupler which is upstream of the brake assembly is eliminated. In some embodiments, the brake assembly is provided downstream of the wheel end gear trains in at least one of the wheel end assemblies. This further reduces, and substantially eliminates, the backlash in the system.

The following describes one or more example implementations of the disclosed brake assembly of the tandem wheel assembly. While discussion herein may sometimes focus on the example application of a tandem wheel assembly of a tree harvesting forwarder, the disclosed tandem wheel assembly may also be applicable to tandem axles in other types of work vehicles, including self-propelled or towed work vehicles, as well as various other agricultural machines (e.g., articulated tractors, utility tractors, motor graders, front end loaders, harvesters and the like), various construction and forestry machines (e.g., skidders and so on), and transportation vehicles (e.g., semi-trailers).

Example Embodiments of Tandem Wheel Assembly with Wheel End Brake Assembly

Referring to FIG. 1, in some embodiments, the disclosed work vehicle 10 may be a tree harvesting forwarder, although, as noted, the tandem wheel described herein may be applicable to a variety of machines, such as motor graders, skidders, other construction vehicles, agricultural vehicles including articulated-frame tractors, other forestry vehicles, and transportation vehicles such as semi-trailers. As shown, the work vehicle 10 may be considered to include a chassis 12 constituted by a rear frame 14 having a load space 16 formed for the transportation of the felled trees and a front frame 18 having an operator cabin 20. The rear frame 14 and the front frame 18 may be connected by an articulated joint. A crane 22, intended for the manipulation of felled trees into the load space 16, is mounted to the rear frame 14 rearward of the operator cabin 20. At the head of the crane 22, a loading grapple 24 is provided, equipped with gripping members known as such, which are turned towards or away from each other by an actuator provided in them, wherein the loading grapple 24 can be used for gripping one or more tree trunks for hauling them to a desired location. The loading grapple 24 can also be rotated so that the felled trees in the loading grapple 24 can be brought to a suitable position when they are loaded into or unloaded from the load space 16. The crane 22 is selectively positioned by a drive system 26. The work vehicle 10 may further be considered to include a power train 28, a controller 30, and a hydraulic system 32. The work vehicle 10 includes a tandem wheel assembly 34 including the brake assembly 36. The tandem wheel assembly 34 is on the rear frame 14 for mounting two wheels 38, 40 on a left side of the work vehicle 10 and for mounting two wheels 42, 44 on a right side of the work vehicle 10, and further may have a like tandem wheel assembly on the front frame 18 for mounting two wheels on a left side of the work vehicle 10 and for mounting two wheels on a right side of the work vehicle 10. The wheels 38, 40, 42, 44 include a pair of left wheels defined by a first left wheel 38 and a second left wheel 40, and a pair of right wheels defined by a first right wheel 42 and a second right wheel 44 (also collectively referred to as "the four tandem wheels 38, 40, 42, 44"). It should be noted that any left/right wheel pairs may be arranged as dual wheels on each left/right lateral side of the work vehicle 10 (e.g., sides in the x-direction illustrated in FIG. 1).

Generally, the power train 28 includes a source of propulsion 46, such as an engine, which supplies power to the work vehicle 10, as either direct mechanical power or after being converted to electric power (e.g., via batteries) or hydraulic power. In one example, the engine may be an internal combustion engine, such as a diesel engine, that is controlled by an engine control module (not shown) of the controller 30. It should be noted that the use of an internal combustion engine is merely an example, as the source of propulsion 46 may be a fuel cell, an electric motor, a hybrid-gas electric motor, or other power-producing devices. A transmission 48 transmits power from the source of propulsion 46 to one or more of the wheels 38, 40, 42, 44. Additionally, the power train 28 has wheel steering components 50, including various devices (e.g., power steering pumps and lines, steering mechanisms, and the like) that couple manual (e.g., operator steering controls or wheel) and/or automated (via the controller 30) steering input to one or more of the sets of wheels.

In addition to providing tractive power to propel the work vehicle 10, the source of propulsion 46 may provide power to various onboard subsystems, including various electrical and hydraulic components of the work vehicle 10, and for off-boarding power to other sub-systems remote from the work vehicle 10. For example, the source of propulsion 46 may provide mechanical power that is converted to an electric format to run the electronics of the controller 30 and one or more electric drives of the work vehicle 10. The power train 28 thus may have mechanical to electrical power conversion components 52, one or more batteries 54, and associated electronics, including various alternators, generators, voltage regulators, rectifiers, inverters, and the like. The source of propulsion 46 may also provide mechanical power that is converted to hydraulic format to power various pumps and compressors that pressurize fluid to drive various actuators of the hydraulic system 32 in order to power wheel steering and braking and various work implements onboard the work vehicle 10. The hydraulic system 32 may include other components (e.g., valves, flow lines, pistons/cylinders, seals/gaskets, and so on), such that control of various devices may be effected with, and based upon, hydraulic, mechanical, or other signals and movements.

The controller 30 may be configured as a computing device with associated processor devices and memory architectures, as a hard-wired computing circuit (or circuits), as a programmable circuit, as a hydraulic, electrical, or electro-hydraulic controller. The controller 30 may be configured to execute various computational and control functionality with respect to the work vehicle 10, including various devices associated with the drive system 26, the power train 28, the hydraulic system 32, and various additional components of the work vehicle 10. In some embodiments, the controller 30 may be configured to receive input signals in various formats (e.g., as hydraulic signals, voltage signals, current signals, and so on), and to output command signals in various formats (e.g., as hydraulic signals, voltage signals, current signals, mechanical movements, and so on).

As noted above, the hydraulic system 32 may be controlled by the controller 30 (automatically, via operator input, or both). The hydraulic system 32 may be powered by the source of propulsion 46 and configured in various arrangements to serve a plurality of hydraulic functions (e.g., powering the drive system 26). Accordingly, the hydraulic system 32 may have components (not shown) including a pump for supplying pressurized hydraulic fluid, a reservoir for storing hydraulic fluid, and various valves (e.g., a control valve) associated with each function.

Figure 2:
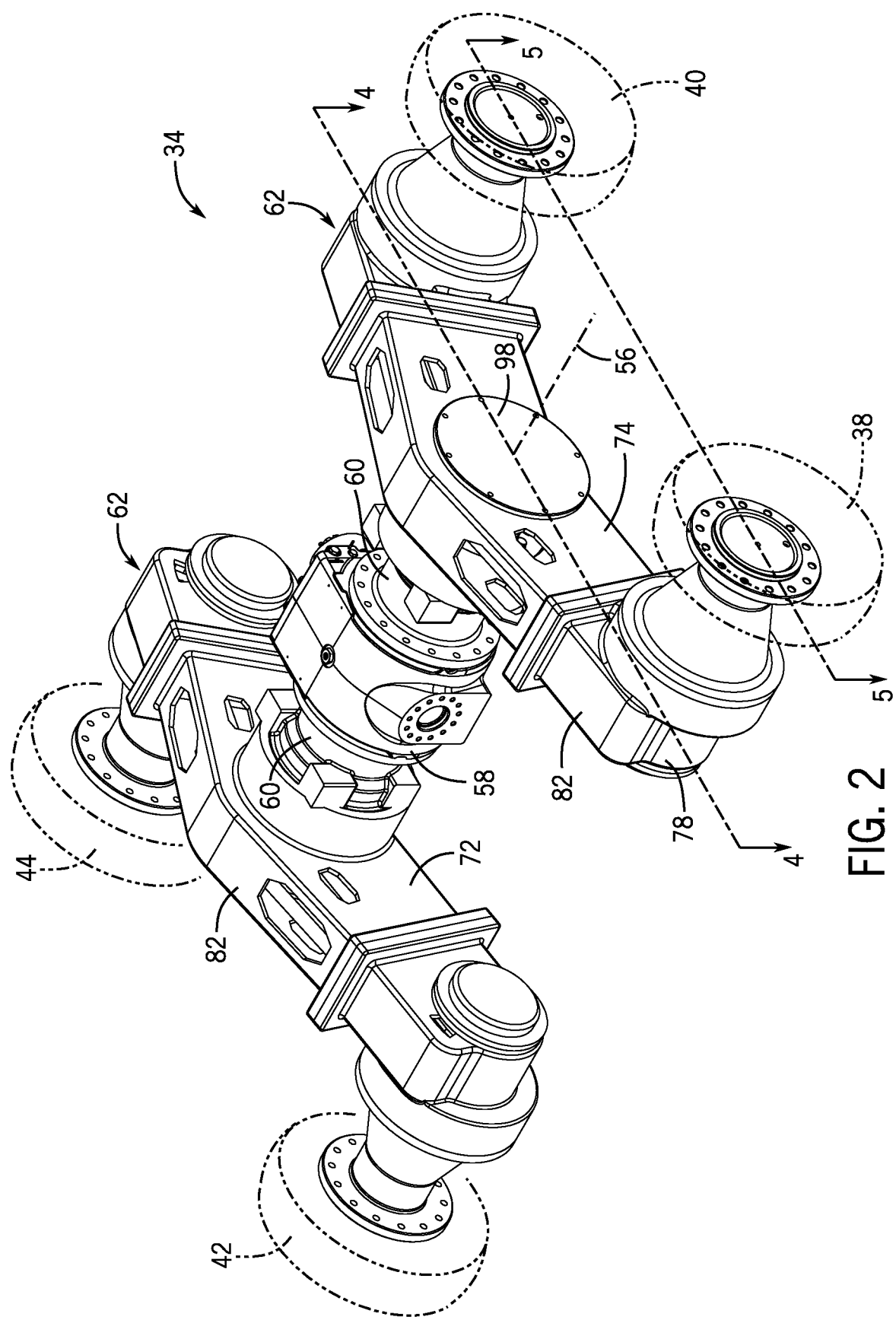
FIG. 2 is an isometric view of an example tandem wheel assembly of the work vehicle.

In the illustrated example, when the work vehicle 10 drives in the forward direction along the Y direction (indicated in FIG. 1), the tandem wheel assembly 34 follows behind the connection of the crane 22 and the rear frame 14 and supports most weight on the rear frame 14. The tandem wheel assembly 34 is pivotable about a pivot axis 56. In particular, each of the pair of the left wheels 38, 40 and the pair of right wheels 42, 44 can independently pivot relative to the work vehicle 10 about the pivot axis 56. The example tandem wheel assembly 34, FIG. 2, may include a differential housing 58, mounting arms (not shown) for mounting the tandem wheel assembly 34 to the rear frame 14, first and second pivot cages 60, and first and second tandem wheel housings 62. The pivot cages 60 are disposed about the pivot axis 56 rigidly fixed relative to the differential housing 58 and thus the rear frame 14 and functions, in part, as the central pivot about which the tandem wheel assembly 34, and the four tandem wheels 38, 40, 42, 44, pivot relative to the work vehicle 10. Thus, the differential housing 58 and the pivot cages 60 are fixed in place relative to each other, and one or both of the first and second tandem wheel housings 62 pivot independently relative to the rear frame 14, and the differential housing 58 and the respective first and second pivot cages 60.

Figure 3:
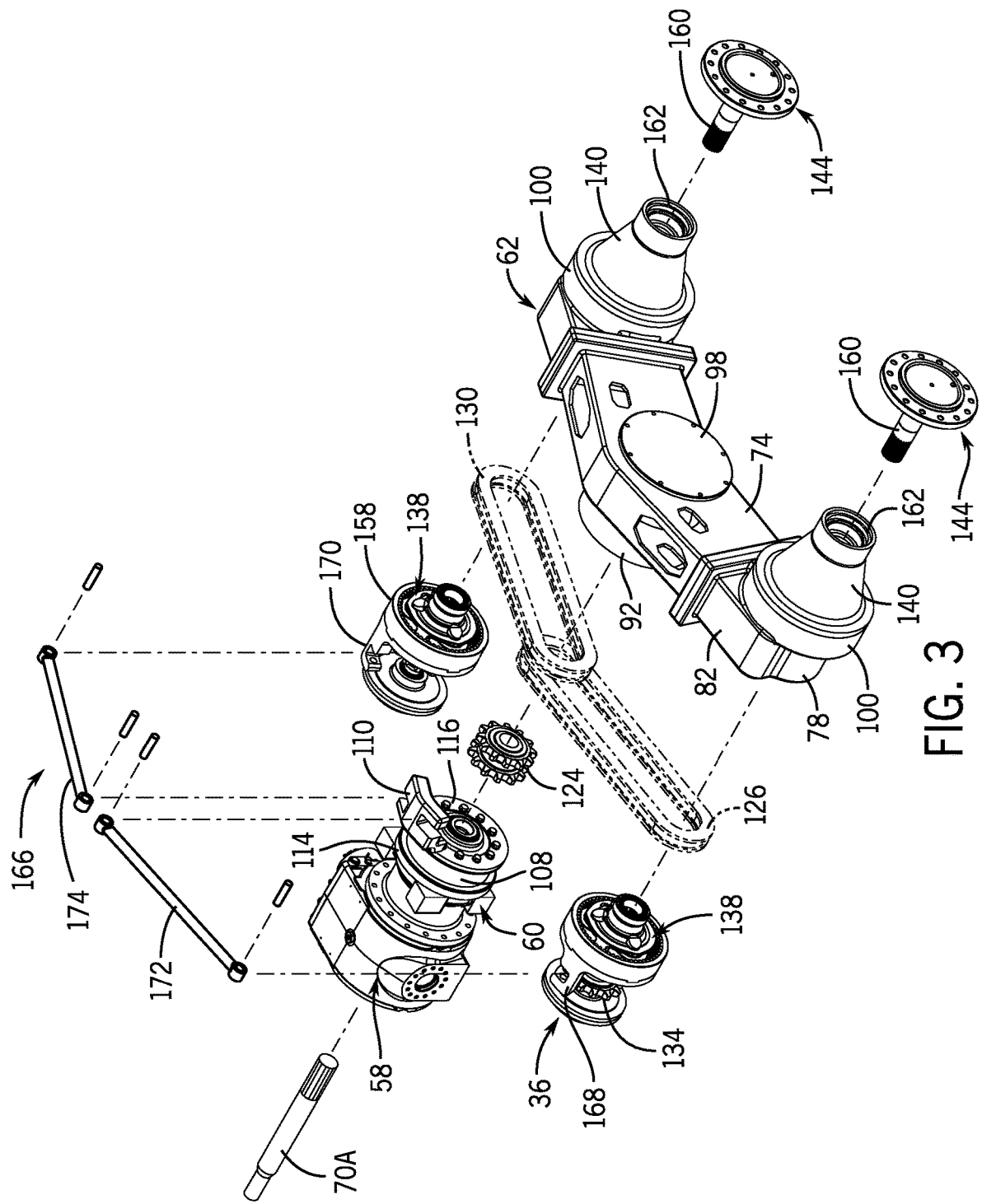
FIG. 3 is an exploded assembly view of the tandem wheel assembly.

As also noted above, the tandem wheel assembly 34 includes components of the power train 28 to transmit motive power to each of the four wheels 38, 40, 42, 44, FIG. 3. A differential 64 is mounted in the differential housing 58 and connected to a driveshaft 66 that is driven by the transmission 48. The differential 64 includes gearing components 68 to split and translate rotation of the driveshaft 66 laterally outboard toward the first and second tandem wheel housings 62. The gearing components 68 are coupled to a first shaft 70a which couples with the pivot cage 60 in the first tandem housing 62, and a second shaft 70b which couples with the pivot cage 60 in the second tandem housing 62. The differential 64 may be a limited-slip differential with a clutch pack for resisting slip. Although not illustrated in detail, the differential housing 58 may house additional components of the differential 64, including u-joint(s), ring gear, pinion shaft(s), pinion gear(s), planet gear(s), side gears, clutch plates, bearings, and the like. Any type of differential may be implemented within the tandem wheel assembly 34, including an open differential, limited slip differential, or the like. The differential housing 58 also mounts portions of the driveshaft 66 and portions of the first and second shafts 70a, 70b. A fore-aft centerline of the work vehicle 10 is defined between the tandem wheel housings 62 and is transverse to the pivot axis 56, and may fall along the driveshaft 66.

Each tandem wheel housing 62, FIGS. 3-7, is a generally hollow part that has an exterior inboard wall 72 and an exterior outboard wall 74 defining an internal volume 76 that extends from a front wall 78 to a rear wall 80 and extends between an upper wall 82 and a lower wall 84. The exterior inboard wall 72 is closer to the fore-aft centerline of the work vehicle 10. A longitudinal axis 86 of the tandem wheel housing 62 is defined between the front wall 78 and the rear wall 80 and is parallel to the fore-aft centerline of the work vehicle 10 and is perpendicular to the pivot axis 56. The inboard wall 72 defines a center opening 88 about the pivot axis 56 which communicates with the internal volume 76, and the outboard wall 74 defines a center opening 90 about the pivot axis 56 which communicates with the internal volume 76 and is aligned with the center opening 88. A cylindrical projection 92 extends from the inboard wall 72 and defines a center passageway 94 about the pivot axis 56 which extends from the opening 88 and communicates with the internal volume 76. An internal shoulder 96 is provided within the cylindrical projection 92 and has ends which are spaced from inboard and outboard ends of the cylindrical projection 92. A cover 98 is attached to the outboard wall 74 over the center opening 90. A front cylindrical wall 100 extends from the outboard wall 74 proximate to the front wall 78 and a rear cylindrical wall 100 extends from the outboard wall 74 proximate to the rear wall 80. A wheel end opening 102 is provided through the outboard wall 74 at the center of each cylindrical wall 100 which communicates with the internal volume 76. An arcuate-shaped opening 104 is provided in the outboard wall 74 proximate to each cylindrical wall 100. Each arcuate-shaped opening 104 is spaced vertically above the respective wheel end opening 102. Openings 106, which communicate with the internal volume 76, are provided through the inboard wall 72 and each is aligned with a respective wheel end opening 102. Each tandem wheel housing 62 may be formed of cast metal or other suitable structural material. Each tandem wheel housing 62 may be made in a modular form; as shown each tandem wheel housing 62 has three parts which are affixed together.

Figure 4:
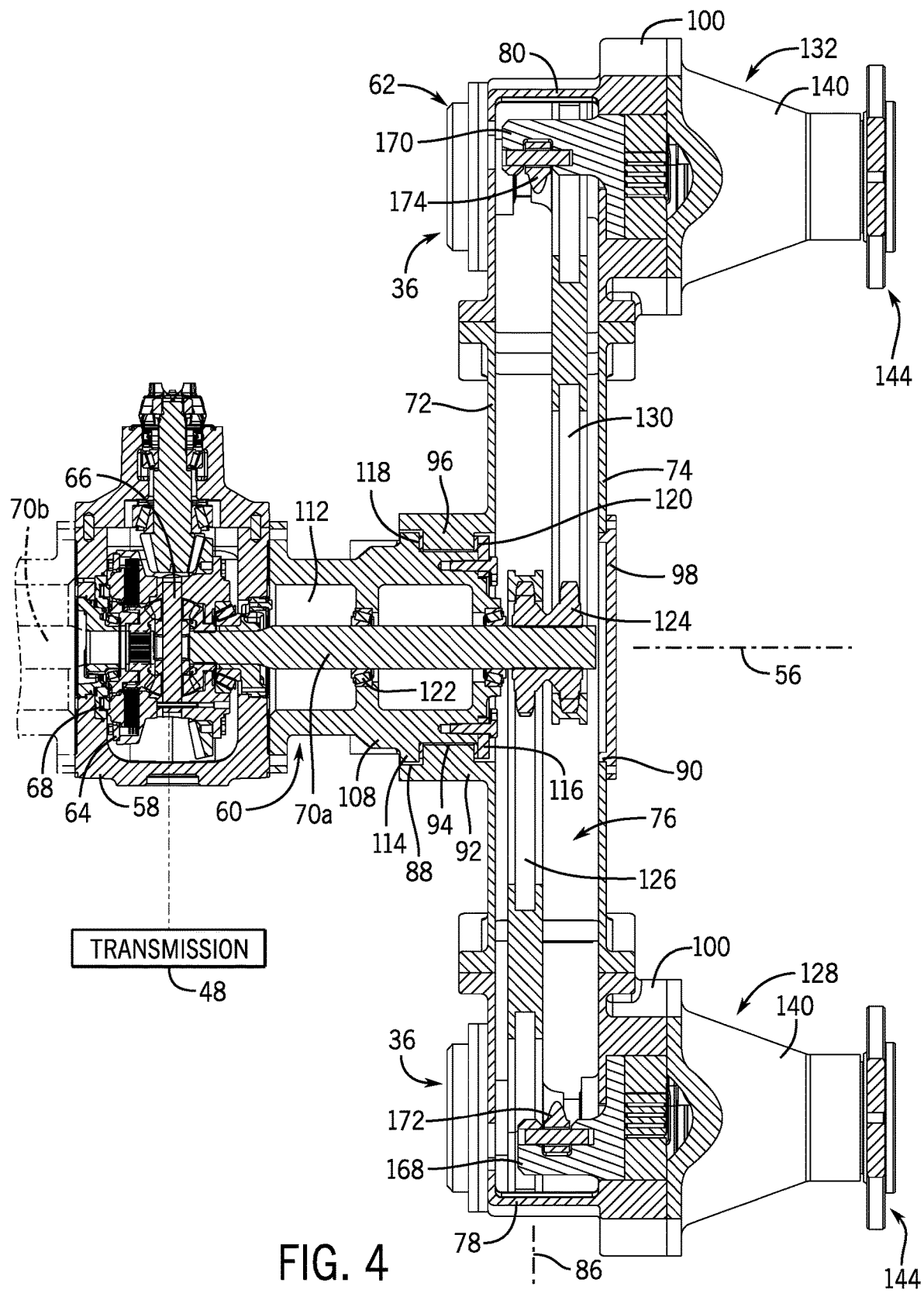
FIG. 4 is a cross-sectional view of the tandem wheel assembly along line 4-4 of FIG. 2.

Referring also to FIG. 4, each pivot cage 60 has an annular body 108 disposed about the pivot axis 56 coupled to the differential housing 58 and an arm 110 extending from an outboard end of the body 108. A passageway 112 is provided through the annular body 108 and extends from an inboard end thereof to an outboard end thereof. The pivot cages 60 may be formed of cast metal or other suitable structural material. The annular body 108 of the respective pivot cage 60 seats within the passageway 94 of each tandem wheel housing 62, and the arm 110 extends into the internal volume 76 of each tandem wheel housing 62. A pair of flanges 114, 116 extend outward from the annular body 108 and the shoulder 96 seats between the flanges 114, 116. Circular bushings and bearings 118, 120 are provided between the shoulder 96 and the flanges 114, 116 to promote pivoting of the tandem wheel housing 62 around the pivot cage 60 and relative to the chassis 12. The shaft 70a, 70b extends through the passageway 112 of the respective pivot cage 60 and into the internal volume 76 of the respective tandem wheel housing 62. Suitable bearings 122 mount the shaft 70a, 70b for rotation to the annular body 108 of the respective pivot cage 60.

The components in each tandem wheel housing 62 may be identical, mirror images. Each tandem wheel housing 62 has a center drive member 124, which may be a sprocket, mounted for co-rotation with the respective shafts 70a, 70b, a first coupler 126 connecting the center drive member 124 to a front wheel end assembly 128 on a first side of the center drive member 124, and a second coupler 130 connecting the center drive member 124 to a rear wheel end assembly 132 on a second side of the center drive member 124, FIG. 3. In some embodiments, the center drive member 124 is a dual-ring sprocket that mounts the first coupler 126 extending to the front wheel end assembly 128 and the second coupler 130 extending to the rear wheel end assembly 132. The center drive member 124 is positioned laterally outboard of the annular body 108 and within the internal volume 76.

Figure 5:
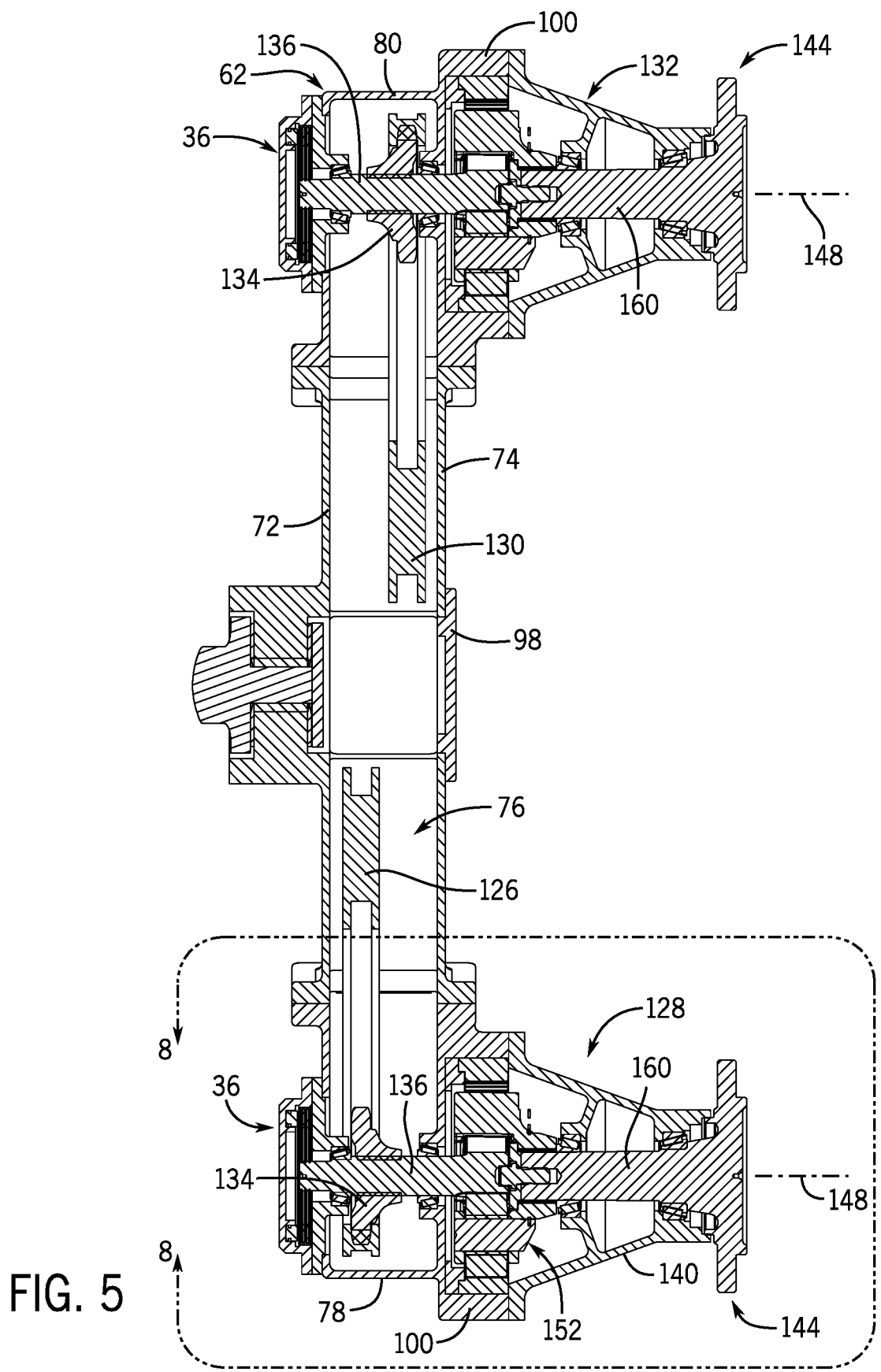
FIG. 5 is a cross-sectional view of the tandem wheel assembly along line 5-5 of FIG. 2.
Figure 6:
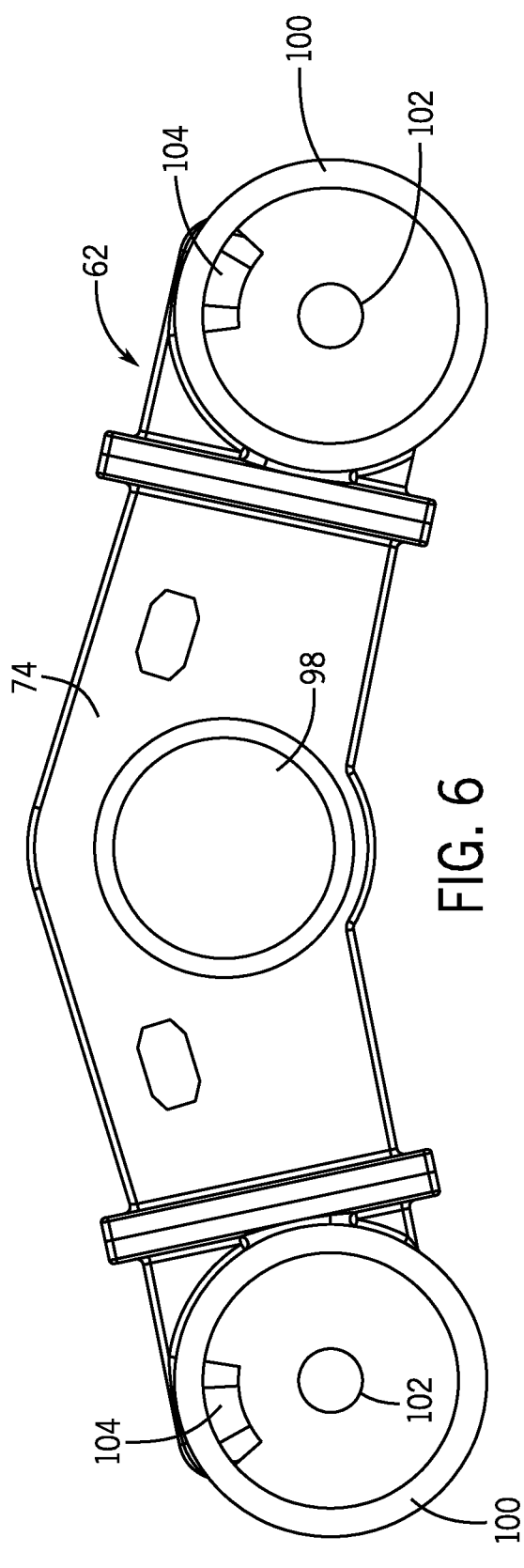
FIG. 6 is a side elevational view of a tandem wheel housing of the tandem wheel assembly viewed from an outboard side of the tandem wheel housing.
Figure 7:
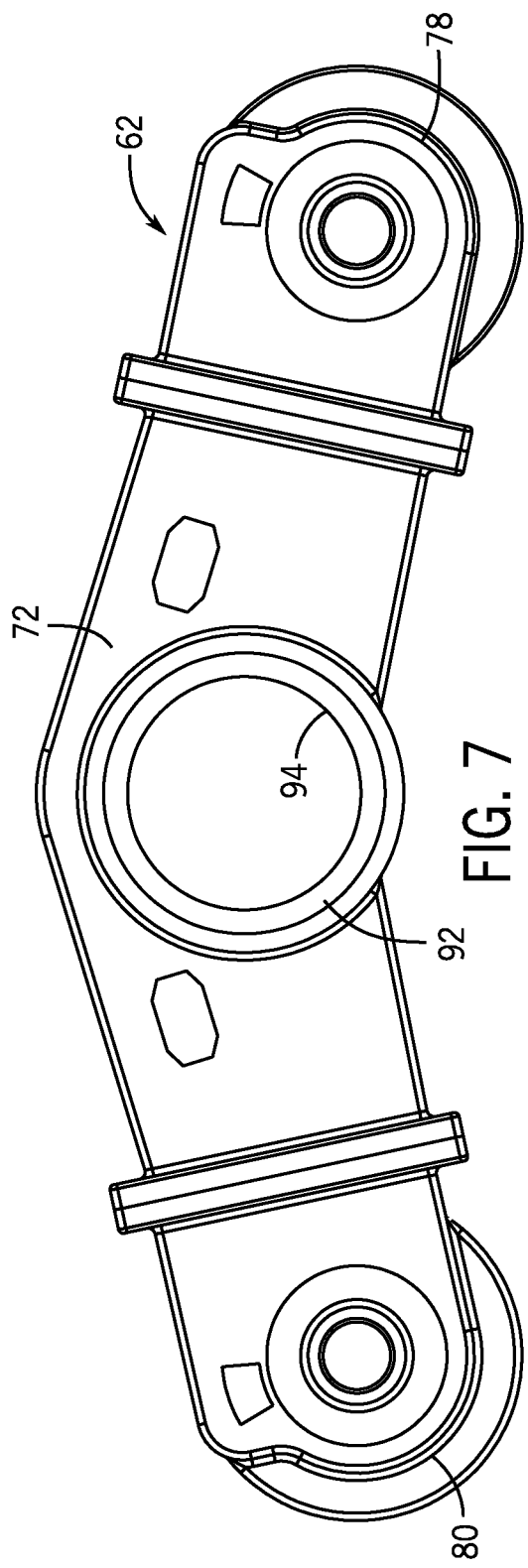
FIG. 7 is a side elevational view of a tandem wheel housing of the tandem wheel assembly viewed from an inboard side of the tandem wheel housing.

Each wheel end assembly 128, 132, FIG. 5, includes a wheel end drive member 134, which may be a sprocket, within the internal volume 76 and mounted on an input shaft 136 for co-rotation therewith, a wheel end gear train 138 coupled to the input shaft 136, a wheel end housing 140 which defines an internal volume 142, and a wheel end hub 144. The wheel end housing 140 is fixedly mounted on an outboard end of each cylindrical wall 100 and forms part of the tandem wheel housing 62. The wheel end gear train 138 is positioned within the cylindrical wall 100, proximate to an outboard surface of the outboard wall 74, and extends into the internal volume 76 of the tandem wheel housing 62 and into the internal volume 142 of the wheel end housing 140 as described herein. The input shaft 136 extends from the internal volume 76 of the tandem wheel housing 62, through the wheel end opening 102 through the outboard wall 74 and into internal volume 142 of the wheel end housing 140 to couple with the wheel end gear train 138. The input shaft 136 is coupled to the inboard wall 72 and coupled to the outboard wall 74 by bearings 146. A wheel end axis 148 is defined by each input shaft 136. Each wheel end axis 148 is parallel to the pivot axis 56 and is transverse to the longitudinal axis 86.

The wheel end drive member 134 of the front wheel end assembly 128 is aligned with one of the dual rings of the center drive member 124 and connected thereby by the first coupler 126. The wheel end drive member 134 of the rear wheel end assembly 132 is aligned with the other of the dual rings of the center drive member 124 and connected thereby by the second coupler 130. Although the first coupler 126 is illustrated as mounted inboard relative to the second coupler 130, these relative positions may be reversed. The wheel end drive members 134 will have an equal size (e.g., equal number of teeth) to drive the corresponding first and second left wheels 38, 40 (or the first and second right wheel 42, 44)

at a substantially equal speed. The first and second couplers 126, 130 may be chains, such as leaf chains, roller chains, or other suitable drive chains for heavy construction applications. The chains may be continuous chains without a disassembling or "master" link to improve the torque-handling capabilities of the chains. In another embodiment, the couplers 126, 130 are a plurality of gears coupled between the center drive member 124 and the wheel end drive member 134.

The wheel end gear train 138 includes a sun gear 150 at the end the input shaft 136 and mounted for rotation therewith, a planetary gear set 152 which includes a plurality of planet gears 154 mounted in a planet carrier 156, and a ring gear 158. The sun gear 150 is coupled to the planet gears 154 to drive rotation of the planet gears 154, and the planet gears 154 are coupled to the ring gear 158. The ring gear 158 is mounted within the cylindrical wall 100 of the tandem wheel housing 62. An output shaft 160 of the wheel end hub 144 extends through a wheel end opening 162 in the wheel end housing 140 and is coupled to the planet carrier 156 for rotation therewith. The output shaft 160 supports the wheel end hub 144 of the respective wheel 38, 40, 42, 44 for co-rotation therewith around the wheel end axis 148. The wheel end gear train 138 effects a gear ratio change to rotate the associated wheel end hub 144 and its output shaft 160 about the associated wheel end axis 148. The ring gear 158 is rotatable relative to the tandem wheel housing 62 and relative to the wheel end housing 140 as described herein. Other configurations of the wheel end gear train 138 may be incorporated without departing from the scope of the present disclosure.

Each wheel end housing 140 extends laterally outboard from the outboard wall 74 and has the wheel end opening 162 at the end thereof that supports at least a portion of the wheel end hub 144. The wheel end housing 140 may be cone shaped. The output shaft 160 of the wheel end hub 144 extends through the wheel end housing 140 and the wheel end opening 162, and the output shaft 160 and its wheel end hub 144 are supported in the wheel end housing 140 by rotational bearings 164. The wheel end housing 140 may mount various additional supporting components (not shown).

The wheel end input shaft 136 of the front wheel end assembly 128 defines the front wheel end axis 148 that is a rotation axis of the front wheel end hub 144 and the wheel 38 (or wheel 42 on the right side of the work vehicle 10), the front wheel end input shaft 136 and the front wheel end drive member 134 when driven by the center drive member 124 via the first coupler 126. This front wheel end axis 148 is substantially parallel to the pivot axis 56. The wheel end input shaft 136 of the rear wheel end assembly 132 defines a rear wheel end axis 148 that is a rotation axis of the rear wheel end hub 144 and the wheel 40 (or wheel 44 on the right side of the work vehicle 10), the rear wheel end input shaft 136 and the rear wheel end drive member 134 when driven by the center drive member 124 via the second coupler 130. This rear wheel end axis 148 is substantially parallel to the pivot axis 56. Accordingly, when the center drive member 124 rotates, the couplers 126, 130 provide co-rotation of the wheel end drive members 134 of the wheel end assemblies 128, 132, and rotation of the wheels 38, 40, 42, 44.

To propel the work vehicle 10, the source of propulsion 46 provides power to the transmission 48 that drives the differential 64 and the shaft 70, which, in turn, drives the wheel end assemblies 128, 132 through the couplers 126, 130. In each wheel end assembly 128, 132, the couplers 126, 130 cause rotation of the wheel end drive member 134 and the sun gear 150 mounted thereon, which rotates the planet gears 154, which causes the planet carrier 156 to rotate relative to the ring gear 158, thereby causing rotation of the output shaft 160 of the wheel end hub 144, to ultimately turn the pair of right wheels 38, 40 mounted on the wheel end assemblies 128, 132 (or to ultimately turn the pair of left wheels 38, 40 mounted on the wheel end assemblies 128, 132 in the left tandem wheel housing 62). The transmission 48 generally includes one or more gear arrangements and/or clutches (not shown) to modify the speed of the input from the source of propulsion 46 into one or more speeds suitable for the tandem wheel assembly 34.

During use, if the work vehicle 10 encounters an obstacle or an uneven surface, the tandem wheel assembly 34 accommodates this by pivoting relative to the chassis 12 of the work vehicle 10 around the pivot cages 60. In the embodiment as shown, reaction assemblies 166, which form a walking beam configuration, counteract the forces that cause the tandem wheel assembly 34 to pivot. The reaction assemblies 166 provide improved downforce distribution to each of the pair of the left wheels 38, 40 and the pair of right wheels 42, 44 during operation of the work vehicle 10, especially during acceleration and deceleration of the work vehicle 10. The reaction assemblies 166 respond to input torque changes with reactive forces or moments to maintain each of the pair of the left wheels 38, 40 and the pair of right wheels 42, 44 into engagement with the ground. As a result, the transfer of bumps or terrain changes is mitigated or eliminated, maintaining the crane 22 and the cabin 20 in a relatively stable position that maintains traction and weight distribution.

In the embodiment as shown, the reaction assembly 166, FIGS. 3 and 4, includes the pivot cage 60, a front reaction bar support 168 attached to an inboard end of the ring gear 158 of the wheel end gear train 138 of the front wheel end assembly 128 for co-rotation therewith, a rear reaction bar support 170 attached to an inboard end of the ring gear 158 of the wheel end gear train 138 of the rear wheel end assembly 132 for co-rotation therewith, a front reaction bar 172 coupled between the front reaction bar support 168 and the arm 110 of the pivot cage 60, and a rear reaction bar 174 coupled between the rear reaction bar support 170 and the arm 110 of the pivot cage 60. Each reaction bar support 168, 170 extends from an inboard end of the ring gear 158 and extends through the respective arcuate-shaped receiving openings 104 in the outboard wall 74 of the tandem wheel housing 62. Each receiving opening 104 has a length in a fore-aft direction which is greater than a length of the reaction bar support 168, 170 to allow limited movement of the ring gears 158 relative to the tandem wheel housing 62. The receiving openings 104 provide for communication of the internal volume 142 of the wheel end housing 140 with the internal volume 76 of the tandem wheel housing 62. Each reaction bar 172, 174 is an elongate and rigid member. The front reaction bar 172 is pivotally coupled to the pivot cage 60 and pivotally coupled to the reaction bar support 168. The front reaction bar 172 is laterally offset from the coupler 126, and as shown is laterally inboard of the coupler 126. The rear reaction bar 174 is pivotally coupled to the pivot cage 60 and pivotally coupled to the reaction bar support 170. The rear reaction bar 174 is laterally offset from the coupler 126, and as shown is laterally outboard of the coupler 130. The reaction bars 172, 174 seat within the internal volumes 76 the tandem wheel housings 62 and can pivot relative to each other. In some scenarios, an increase of power from the source of propulsion 46 may tend to rotate the reaction assembly 166 about the pivot axis 56, lifting the leading wheel 38 or 42 from the ground while increasing the downward pressure on the trailing wheel 40 or 44. To counteract this tendency, the reaction bars 172, 174 provide an opposing force, transferring torque directly to the chassis 12. The amount of rotation of the ring gears 158 and the reaction bar supports 168, 170 is limited by the length of the receiving opening 104. Also, a sudden decrease in power from the source of propulsion 46 may reverse the direction of rotation of the reaction assembly 166 about the pivot axis 56; however, these forces may be counteracted by the reaction bars 172, 174. Again, the amount of rotation of the ring gears 158 and the reaction bar supports 168, 170 is limited by the length of the receiving opening 104. Accordingly, rotation of the reaction assembly 166 relative to the chassis 12 may be limited, and torque delivered to the wheels 38, 40 or 42, 44 may be substantially equal. While reaction assemblies 166 are described and shown herein, the reaction assemblies 166 are not essential to the functioning of the present disclosure and may not be provided. When the reaction assemblies 166 are not provided, the ring gears 158 are rotationally affixed to the cylindrical walls 100.

With the present tandem wheel assembly 34, backlash is provided between the center drive member 124 and each coupler 126, 130, between the coupler 126 and the front wheel end drive member 134, within the front wheel end gear train 138, between the front wheel end gear train 138 and the output shaft 160 at the front wheel end assembly 128, between the coupler 126 and the rear wheel end drive member 134, within the rear wheel end gear train 138, and between rear wheel end gear train 138 and the output shaft 160 of the rear wheel end assembly 132. In addition, if chains are provided as the couplers 126, 130, any slack in the chains contributes to backlash. It is desirable to reduce or substantially eliminate this backlash to improve performance of the work vehicle 10 during operation. The brake assembly 36 of present disclosure not only operates to stop the rotation of the wheels 38, 40, 40, 42, the brake assembly 36 of present disclosure also provides a reduction or substantial elimination of the backlash. In a first embodiment, the brake assembly 36 is disposed between the tandem wheel housing 62 and the input shaft 136. As a result, any backlash of components upstream (between the center drive member 124 and the coupler 126 and/or 130, between the coupler 126 and/or 130 and the wheel end drive member 134 of the front and/or rear wheel end assembly 128 and/or 132, and any slack within a chain when provided as the coupler 126 and/or 130) is substantially reduced any may be eliminated. In a second embodiment, the brake assembly 36 is disposed between the tandem wheel housing 62 and the output shaft 160. As a result, any backlash of components upstream (between the center drive member 124 and the coupler 126 and/or 130, between the coupler 126 and/or 130 and the wheel end drive member 134 of the front and/or rear wheel end assembly 128 and/or 132, within the wheel end gear train 138 of the front and/or rear wheel end assembly 128 and/or 132, between the wheel end gear train 138 of the front and/or rear wheel end assembly 128 and/or 132 and the output shaft 160 of the front and/or rear wheel end assembly 128 and/or 132) and any slack within a chain when provided as the coupler 126 and/or 130) is substantially reduced any may be eliminated. Each wheel end assembly 128, 132 in each tandem wheel housing 62 may have a brake assembly 36, however, in some embodiments, only one of the wheel end assemblies 128, 132 in each tandem wheel housing 62 has a brake assembly 36.

Each brake assembly 36 includes a plurality of interleaved friction discs 176 and backing discs 178, see FIGS. 8-13, some of which are rotationally fixed to the tandem wheel housing 62 and some of which are rotationally fixed to either the input shaft 136 or the output shaft 160, and an actuator 180. The friction discs 176 are circular with inboard and outboard surfaces, a central opening having a plurality of spaced apart teeth 182, and an exterior surface 184 defined by the outer diameter of each friction disc 176 is smooth. A friction material 186 is provided on the inboard surface of each friction disc 176, and a friction material 188 is provided on the outboard surface of each friction disc 176 (the friction materials 186, 188 are shown exploded from the friction discs 176 in FIG. 10 for illustration purposes). The friction materials 186, 188 may have a roughened surface, raised surfaces, and like thereon. The backing discs 178 are circular with planar inboard and outboard surfaces and a central opening 190. A plurality of spaced apart teeth 192 are provided on the exterior of each backing disc 178 and an inner surface defined by the opening 190 of each backing disc 178 is smooth. Friction discs 176 are between two adjacent backing discs 178. The teeth 182 of the friction discs 176 extend inwardly of the openings 190 of the backing discs 178, and the teeth 192 of the backing discs 178 extend outwardly of the exterior surfaces 184 of the friction discs 176.

Figure 8:
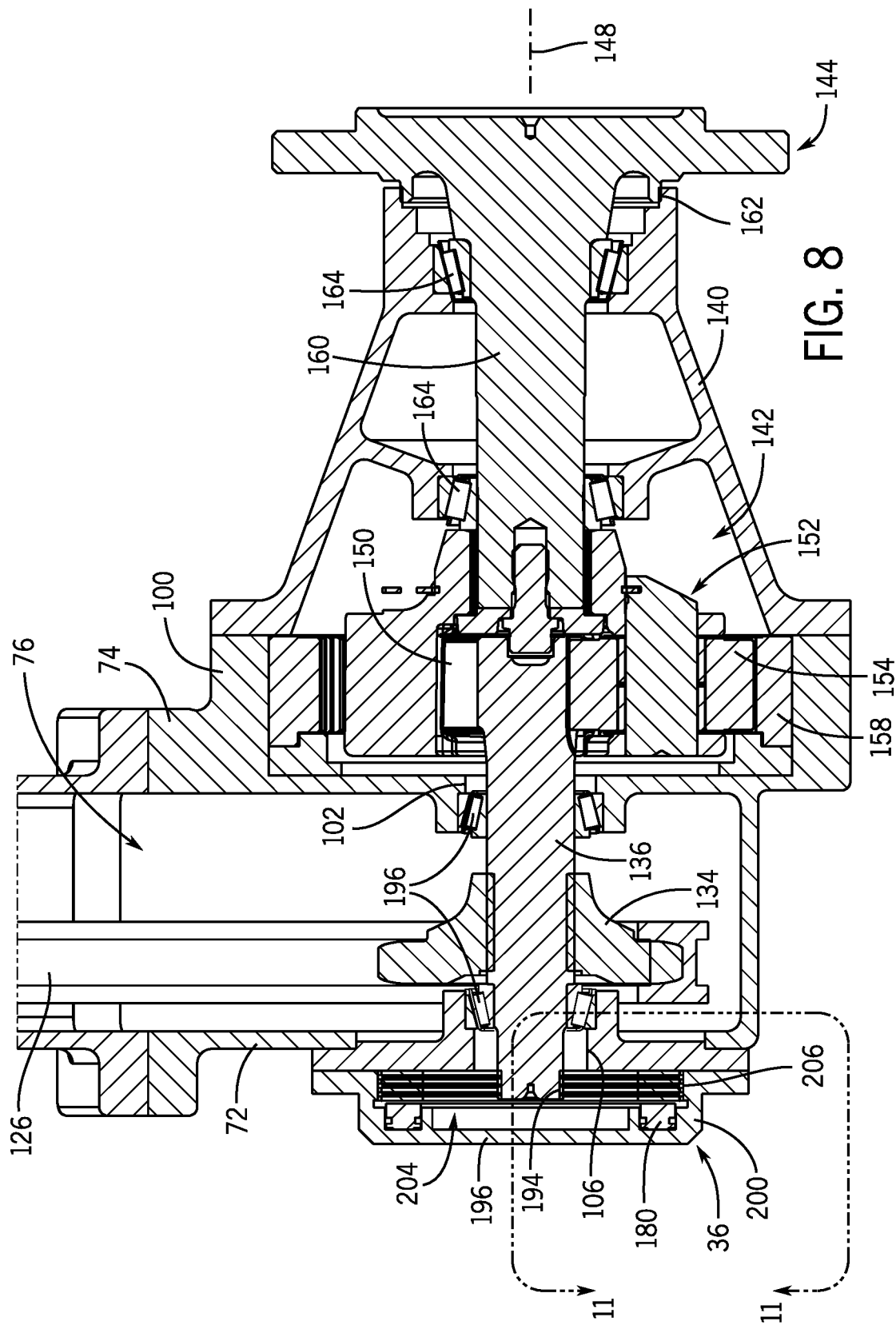
FIG. 8 is a partial cross-sectional view showing an enlargement of area 8-8 of FIG. 5.
Figure 9:
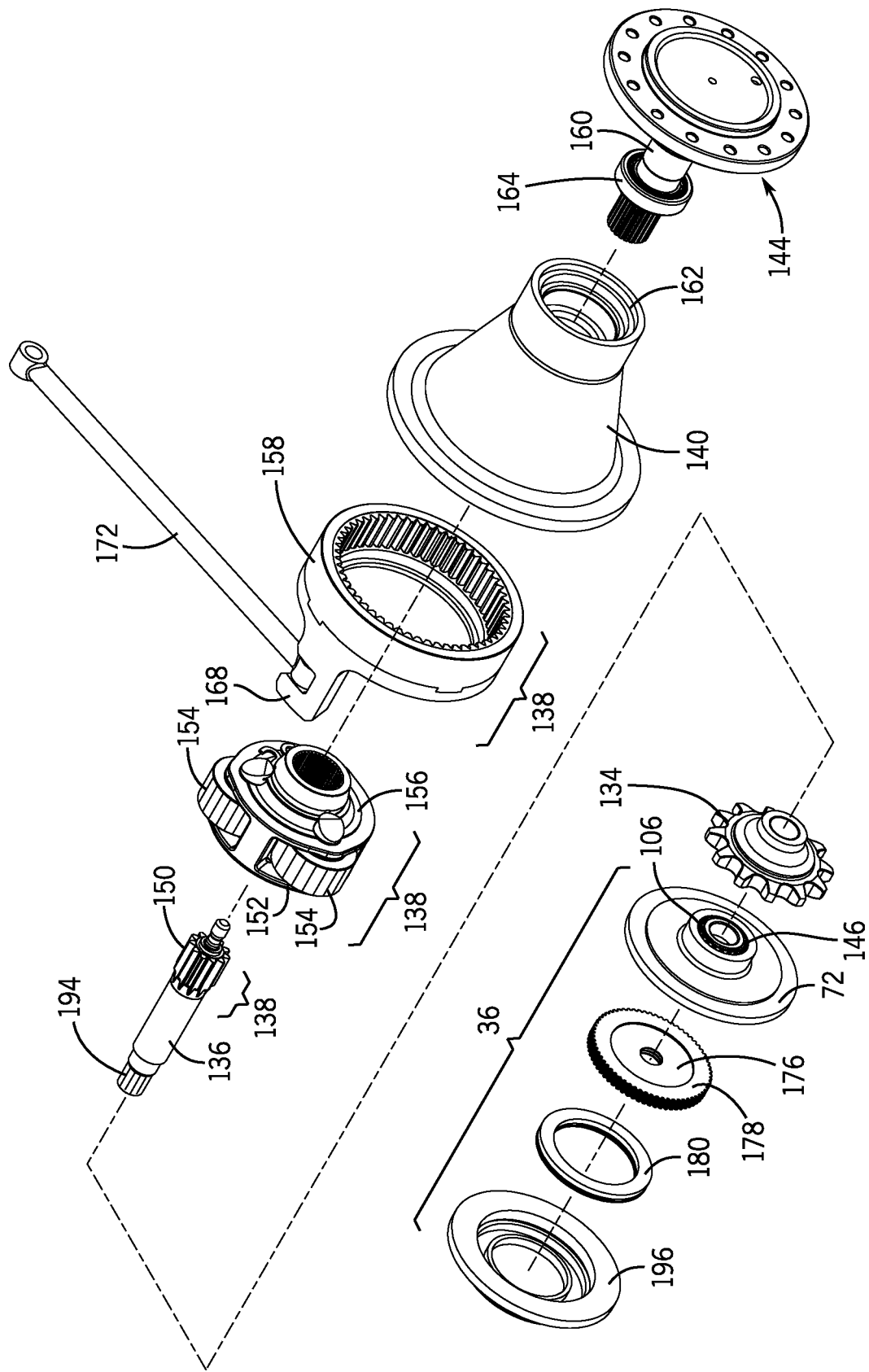
FIG. 9 is an exploded assembly view of components of a wheel end assembly of the tandem wheel assembly.
Figure 10:
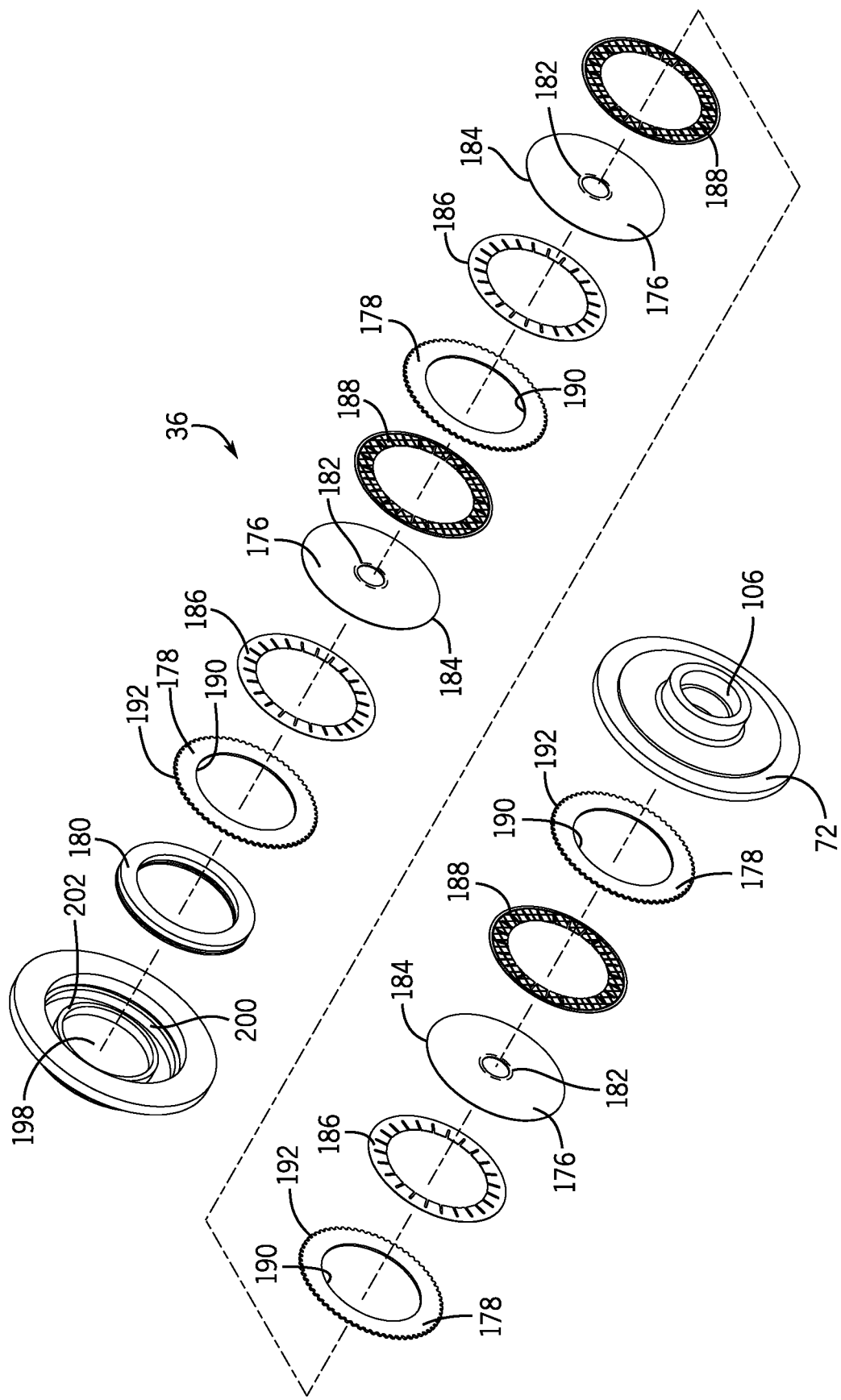
FIG. 10 is an exploded assembly view of components of a brake assembly of the tandem wheel assembly.
Figure 11:
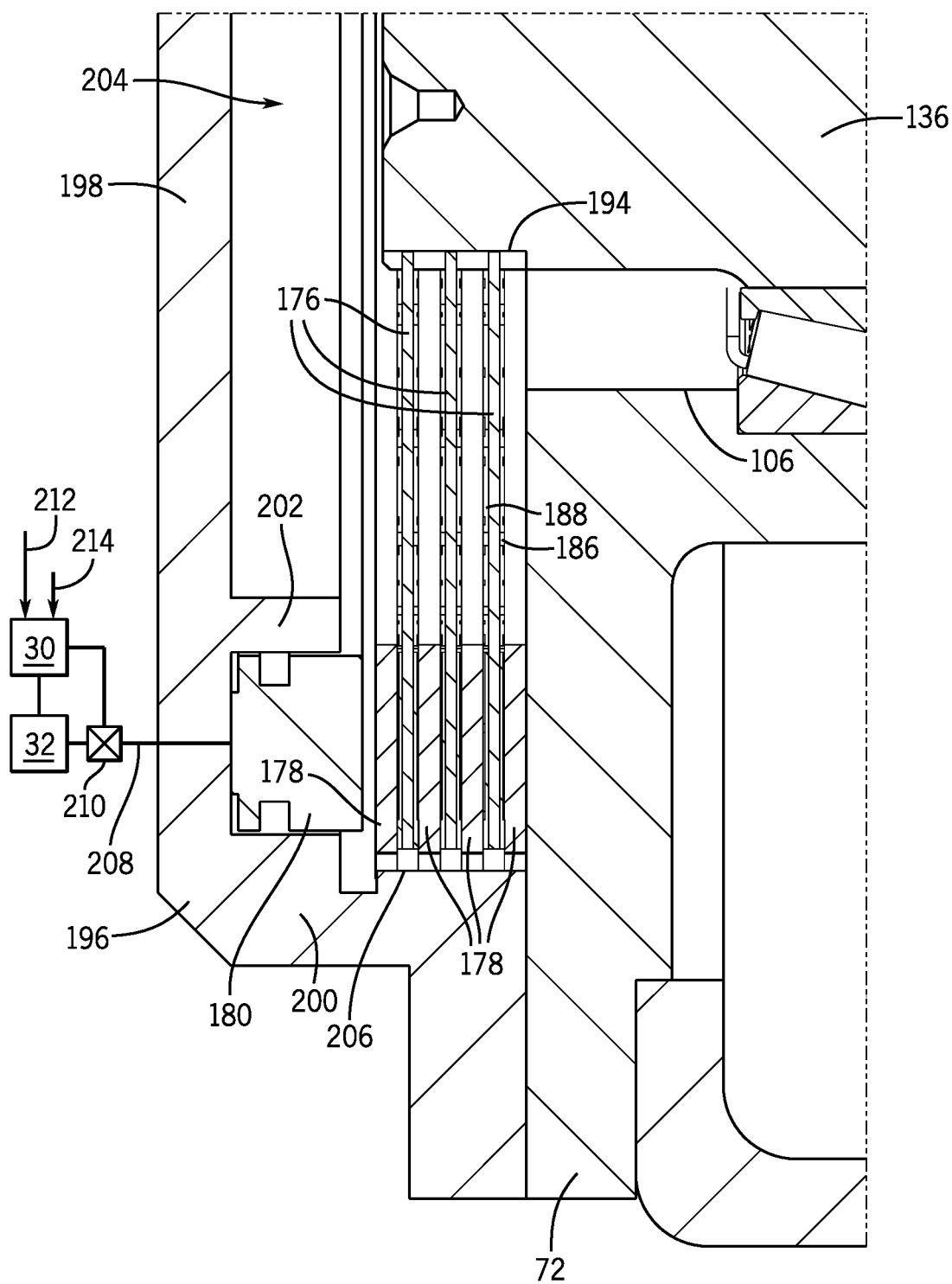
FIG. 11 is a partial cross-sectional view showing an enlargement of area 11-11 of FIG. 8.

In the first embodiment as shown in FIGS. 8, 9 and 11, the brake assembly 36 further includes a plurality of channels 194 on a reduced end section of the input shaft 136, and the inboard wall 72 includes a cover 196 which seats over the opening 106 in the inboard wall 72. The cover 196 thus forms part of the tandem wheel housing 62. The channels 194 mirror the shape of the teeth 182 on the friction discs 176 and each extends along an axis parallel to the wheel end axis 148. The cover 196 is fixed to an exterior surface of the inboard wall 72 of the tandem wheel housing 62 and has an inboard wall 198, an outer side wall 200 which depends from an exterior edge thereof and is affixed to the inboard surface of the inboard wall 72, and an inner side wall 202 which depends from the inboard wall 198 radially inward of the outer side wall 200. The inner side wall 202 does not extend laterally the same distance as the outer side wall 200. The cover 196 and the inboard wall 72 form a recess 204 in which the interleaved friction discs 176, the backing discs 178 and the actuator 180 are positioned. The interleaved friction discs 176 and backing discs 178 are positioned between an outboard end of the inner side wall 202 and the inboard surface of the inboard wall 72. The side wall 200 has a plurality of spaced apart channels 206 which mirror the shape of the teeth 192 on the backing discs 178. Each channel 206 extends along an axis parallel to the wheel end axis 148. The discs 176, 178 surround the input shaft 136, and the teeth 182 on the friction discs 176 seat within the channels 194 in the input shaft 136, and the teeth 192 seat with the channels 206 in the cover 196. The engagement of the teeth 182 of the friction discs 176 within the channels 194 in the input shaft 136 provide for the sliding movement of the friction discs 176 relative to the input shaft 136 while preventing rotational movement relative thereto, and the engagement of the teeth 192 of the backing discs 178 within the channels 206 provide for the sliding movement of the backing discs 178 relative to the cover 196 while preventing rotational movement relative thereto. The actuator 180 is positioned within a pocket of the recess 204 formed by the walls 198, 200, 202 and is proximate to the inboard-most backing disc 178.

In some embodiments, the actuator 180 provides for an actively controlled system which allows for the active control of the brake assembly 36. As shown in FIGS. 8, 9 and 11, the actuator 180 is a hydraulic piston that engages with the inboard backing disc 178. The hydraulic piston is hydraulically connected to the hydraulic system 32 by a hydraulic line 208 and an electro-hydraulic control valve control valve 210 so that the actuator 180 is controlled by the controller 30. When the operator desire to brake the vehicle 10, the operator commands the control 30 to brake. The controller 30 responds to an input 212 to brake which, in turn, commands the hydraulic system 32 to supply hydraulic fluid and the valve 210 to open. The hydraulic fluid flows into the actuator 180 which actuates the actuator 180 to push the discs 176, 178 into engagement with each other. Because of the friction material 186, 188, this prevents the rotation of the input shaft 136 relative to the tandem wheel housing 62. When the operator desires for braking to stop, the controller 30 responds to an input 214 by the operator which, in turn, commands the hydraulic system 32 to stop supply of the hydraulic fluid and the valve 210 to close. This releases hydraulic pressure on the actuator 180 so that the actuator 180 relieves or removes pressure on the discs 176, 178 rotation of the input shaft 136 relative to the tandem wheel housing 62. The return of the actuator 180 may be effected by a spring (not shown) which may be between the actuator 180 and the inboard backing disc 178 or may be internal within the hydraulic line piston.

Figure 12:
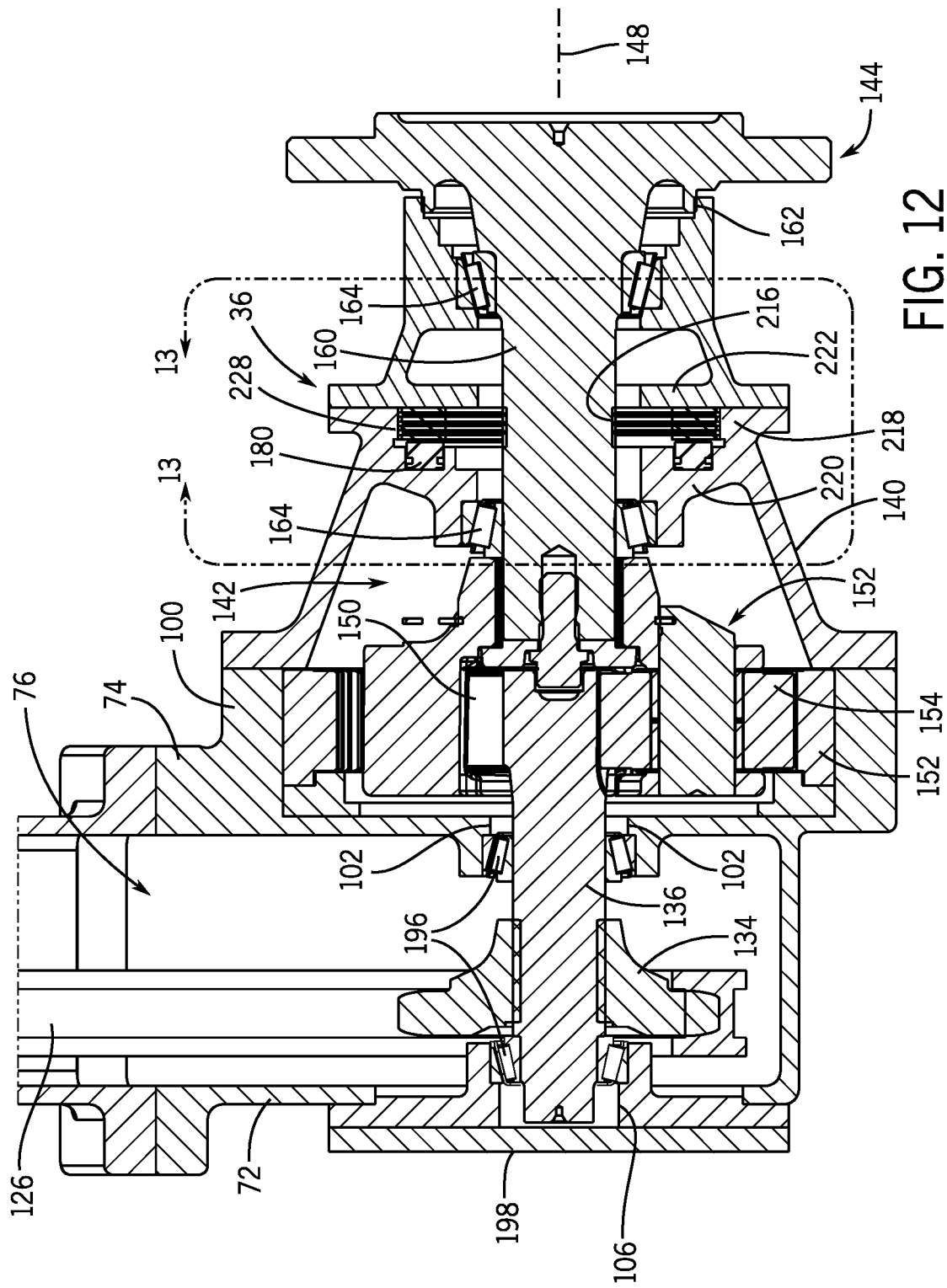
FIG. 12 is a partial cross-sectional view showing a wheel end assembly of another embodiment of a tandem wheel assembly.
Figure 13:
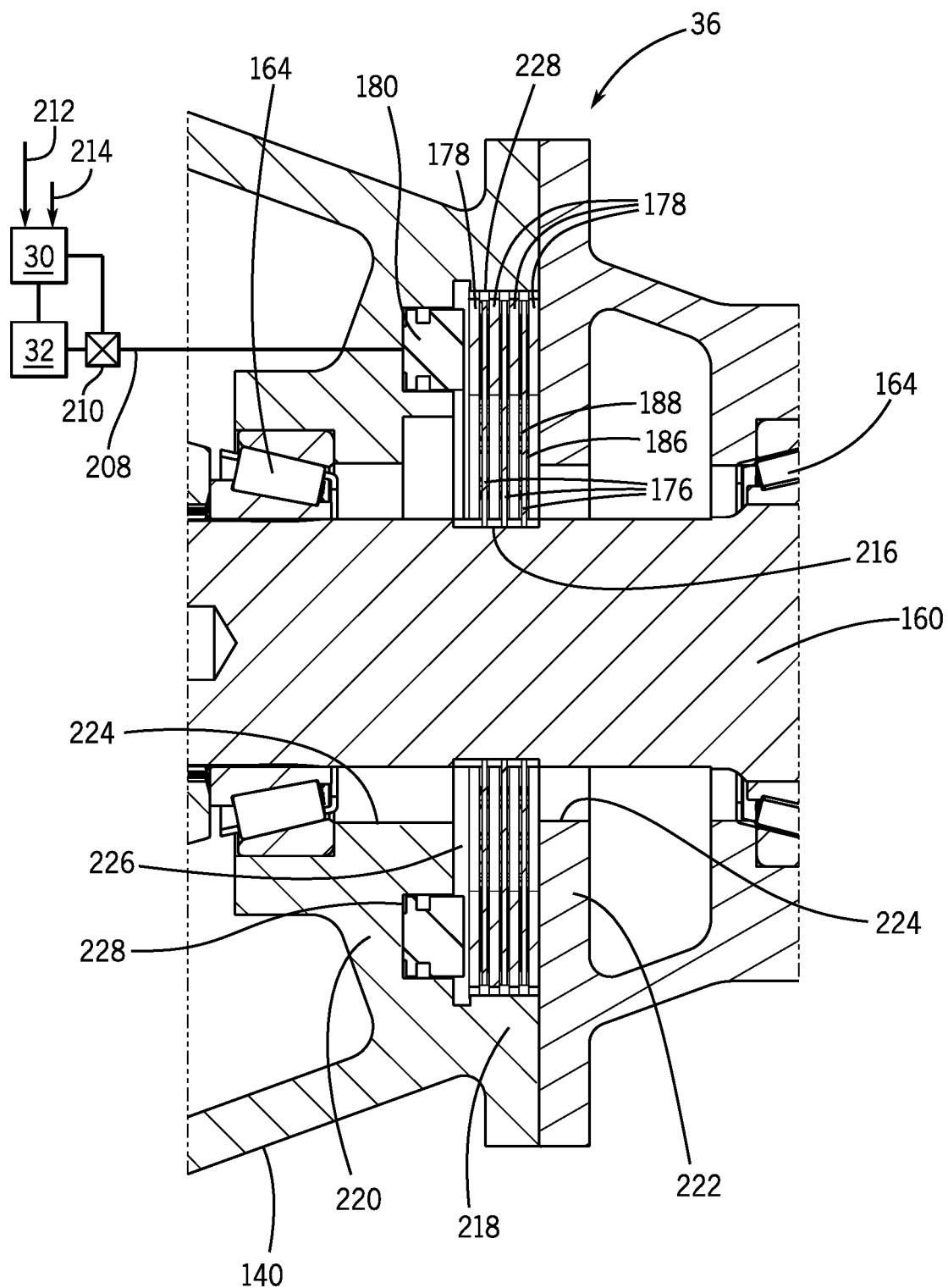
FIG. 13 is a partial cross-sectional view showing an enlargement of area 13-13 of FIG. 12.

In the second embodiment as shown in FIGS. 12 and 13, the brake assembly 36 further includes a plurality of channels 216 on a reduced section of the output shaft 160. The channels 216 mirror the shape of the teeth 182 on the friction discs 176 and each extends along an axis parallel to the wheel end axis 148. The wheel end housing 140 has an outer wall 218, and inboard and outboard internal walls 220, 222 which may be positioned between the sets of rotational bearings 164, each of which extends radially inward from the outer wall 218 and each of which has an opening 224 therethrough. The walls 218, 220, 222 form a cavity 226. The output shaft 160 extends through the openings 224 and the cavity 226, with the reduced section of the output shaft 160 which has the channels 216 positioned between the walls 220, 222. The outer wall 218 has a plurality of spaced apart channels 228 which mirror the shape of the teeth 192 on the backing discs 178. Each channel 228 extends along an axis parallel to the wheel end axis 148. The discs 176, 178 seat between the walls 220, 222, and surround the output shaft 160. The teeth 182 on the friction discs 176 seat within the channels 216 in the output shaft 160, and the teeth 192 seat with the channels 228 in the outer wall 218. The engagement of the teeth 182 of the friction discs 176 within the channels 216 in the output shaft 160 provide for the sliding movement of the friction discs 176 relative to the output shaft 160 while preventing rotational movement relative thereto, and the engagement of the teeth 192 of the backing discs 178 within the channels 228 provide for the sliding movement of the backing discs 178 relative to the wheel end housing 140 while preventing rotational movement relative thereto. The actuator 180 is positioned within a pocket of the recess 204 formed by the wall 220 and is proximate to the inboard-most backing disc 178.

In some embodiments, the actuator 180 provides for an actively controlled system which allows for the active control of the brake assembly 36. As shown in FIGS. 12 and 13, the actuator 180 is a hydraulic piston. The hydraulic piston is hydraulically connected to the hydraulic system 32 by a hydraulic line 208 and an electro-hydraulic control valve control valve 210 so that the actuator 180 is controlled by the controller 30. When the operator desire to brake the vehicle 10, the operator commands the control 30 to brake. The controller 30 responds to an input 212 to brake which, in turn, commands the hydraulic system 32 to supply hydraulic fluid and the valve 210 to open. The hydraulic fluid flows into the actuator 180 which actuates the actuator 180 to push the discs 176, 178 into engagement with each other. Because of the friction material 186, 188, this prevents the rotation of the output shaft 160 relative to the tandem wheel housing 62. When the operator desires for braking to stop, the controller 30 responds to an input 214 by the operator which, in turn, commands the hydraulic system 32 to stop supply of the hydraulic fluid and the valve 210 to close. This releases hydraulic pressure on the actuator 180 so that the actuator 180 relieves or removes pressure on the discs 176, 178 and thereby allows rotation of the output shaft 160 relative to the tandem wheel housing 62. The return of the actuator 180 may be effected by a spring (not shown) which may be between the actuator 180 and the inboard backing disc 178 or may be internal within the hydraulic line piston.

In embodiments where a brake assembly 36 is provided at each wheel end assemblies 128, 132, each brake assembly can be independently controlled. In some embodiments, a first brake assembly 36 is disposed between the tandem wheel housing 62 and the input shaft 136 at one or both wheel end assemblies 128, 132 and a second brake assembly 36 is disposed between the tandem wheel housing 62 and the output shaft 160 at one or both wheel end assemblies 128, 132. Actuation of any of these brake assemblies 36 can be independently controlled.

The foregoing describes one or more example tandem wheel end assemblies in detail. Various other configurations are possible within the scope of this disclosure. For example, the disclosed dual ring two coupler drive in the tandem wheel housing may be replaced with a single ring center drive member and a single coupler coupling the center drive member to both wheel end drive members.

ENUMERATED EXAMPLES

Also, the following examples are provided, which are numbered for easier reference.

1. A tandem wheel assembly for a work vehicle having a chassis and wheels, the tandem wheel assembly comprising: a tandem wheel housing defining a center opening extending along a pivot axis and first and second wheel end openings extending along associated wheel end axes, the tandem wheel housing being pivotally mounted to the chassis about the pivot axis, the pivot axis and the wheel end axes being parallel to each other, and each wheel end axis being spaced longitudinally on opposite sides of the pivot axis; a center drive member disposed within the tandem wheel housing and rotatable with respect to the tandem wheel housing around the pivot axis; first and second wheel end assemblies, each wheel end assembly disposed at one of the wheel end openings and including: an input shaft mounted for rotation within the tandem wheel housing, a wheel end drive member mounted on the input shaft for rotation therewith, a wheel end gear train coupled to the input shaft, an output shaft coupled to the wheel end gear train and rotatable along the wheel end axis, and a wheel end hub coupled to the output shaft for supporting one of the wheels; a coupler between each wheel end drive member and the center drive member, wherein each wheel end drive member is driven by the center drive member; and a brake assembly coupled to the tandem wheel housing and to the input shaft or the output shaft of at least one of the first wheel end assembly or the second wheel end assembly.

2. The tandem wheel assembly of example 1, wherein the brake assembly has a plurality of discs, some of which are rotationally fixed to the tandem wheel housing and some of which are rotationally fixed to either the input shaft or the output shaft of the at least one of the first wheel end assembly or the second wheel end assembly.

3. The tandem wheel assembly of example 2, wherein the tandem wheel housing includes an inboard wall, an outboard wall, and a cover fixedly attached to an exterior surface of the inboard wall and configured to be closer to a fore-aft centerline of the work vehicle when mounted to the work vehicle; and wherein the input shaft extends through an opening in the inboard wall and the brake assembly is coupled to the input shaft between the inboard wall and the cover.

4. The tandem wheel assembly of example 2, wherein the tandem wheel housing includes a wheel end housing fixedly attached to an outboard wall thereof, the output shaft extending through an opening in the outboard wall, the brake assembly being coupled to the output shaft and positioned within the wheel end housing.

5. The tandem wheel assembly of example 4, wherein the wheel end gear train includes a planetary gear set having a sun gear coupled to the input shaft for rotation therewith, a plurality of planet gears mounted within a planet carrier, and a ring gear coupled to the planet gears and fixed to the tandem wheel housing, wherein the output shaft is coupled for rotation with the planet carrier.

6. The tandem wheel assembly of example 2, further including an actuator that causes the discs to engage or disengage.

7. The tandem wheel assembly of example 6, wherein the actuator is a hydraulically driven piston.

8. The tandem wheel assembly of example 7, wherein activation of the hydraulically driven piston is controlled by a controller, the controller is configured to control an electro-hydraulic control valve to control hydraulic pressure to the hydraulically driven piston.

9. The tandem wheel assembly of example 2, wherein the wheel end gear train includes a planetary gear set having a sun gear coupled to the input shaft for rotation therewith, a plurality of planet gears mounted within a planet carrier, and a ring gear coupled to the planet gears and fixed to the tandem wheel housing, wherein the output shaft is coupled for rotation with the planet carrier.

10. The tandem wheel assembly of example 1, wherein the wheel end gear train includes a planetary gear set having a sun gear coupled to the input shaft for rotation therewith, a plurality of planet gears mounted within a planet carrier, and a ring gear coupled to the planet gears and fixed to the tandem wheel housing, wherein the output shaft is coupled for rotation with the planet carrier.

11. The tandem wheel assembly of example 1, wherein the center drive member is a sprocket, and each wheel end drive member is a sprocket is a sprocket; and wherein each coupler is a chain.

12. The tandem wheel assembly of example 1, wherein the tandem wheel housing includes an inboard wall, an outboard wall, and a cover fixedly attached to an exterior surface of the inboard wall thereof; and wherein the input shaft extends through an opening in the inboard wall and the brake assembly is coupled to the input shaft and between the inboard wall and the cover.

13. The tandem wheel assembly of example 1, wherein the tandem wheel housing includes a wheel end housing fixedly attached to an outboard wall thereof; and wherein the output shaft extends through an opening in the outboard wall and the brake assembly is coupled to the output shaft within the wheel end housing.

14. The tandem wheel assembly of example 1, wherein the brake assembly has a first plurality of discs, some of which are rotationally fixed to the tandem wheel housing and some of which are rotationally fixed to either the input shaft or the output shaft of the first wheel end assembly; and wherein the brake assembly has a second plurality of discs, some of which are rotationally fixed to the tandem wheel housing and some of which are rotationally fixed to either the input shaft or the output shaft of the second wheel end assembly.

15. The tandem wheel assembly of example 14, further comprising a first actuator for actuating the first plurality of discs, and a second actuator for actuating the second plurality of discs, wherein each actuator is a hydraulically driven piston and is controlled by a controller, and the controller is configured to control an electro-hydraulic control valve to control hydraulic pressure to each hydraulically driven piston.

CONCLUSION

The examples discussed above result in a reduction or substantial elimination of backlash by providing a tandem wheel assembly with a brake assembly at one or both wheel ends. For example, the brake assembly is disposed between the tandem wheel housing and the input shaft of the wheel end gear train at one or both of the wheel end assemblies. This reduces or substantially eliminates backlash upstream of the brake assembly. In another example, the brake assembly is disposed between the tandem wheel housing and the output shaft downstream of the wheel end gear train at one or both of the wheel end assemblies which reduces or substantially eliminates backlash upstream of the brake assembly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure.

Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A tandem wheel assembly for a work vehicle having a chassis and wheels, the tandem wheel assembly comprising:
a tandem wheel housing defining a center opening extending along a pivot axis and first and second wheel end openings extending along associated wheel end axes, the tandem wheel housing being pivotally mounted to the chassis about the pivot axis, the pivot axis and the wheel end axes being parallel to each other, and each said wheel end axis being spaced longitudinally on opposite sides of the pivot axis, wherein the tandem wheel housing includes an inboard wall, an outboard wall, and a cover fixedly attached to an exterior surface of the inboard wall;
a center drive member disposed within the tandem wheel housing and rotatable with respect to the tandem wheel housing around the pivot axis;
first and second wheel end assemblies, each said wheel end assembly disposed at one of the wheel end openings and including:
an input shaft mounted for rotation within the tandem wheel housing and extending through an opening in the inboard wall,
a wheel end drive member mounted on the input shaft for rotation therewith,
a wheel end gear train coupled to the input shaft,
an output shaft coupled to the wheel end gear train and rotatable along the wheel end axis, and
a wheel end hub coupled to the output shaft for supporting one of the wheels;
a coupler between each wheel end drive member and the center drive member, wherein each wheel end drive member is driven by the center drive member; and
a brake assembly coupled to the input shaft of at least one of the first wheel end assembly or the second wheel end assembly between the inboard wall and the cover.

2. The tandem wheel assembly of claim 1, wherein the brake assembly has a plurality of discs, some of which are rotationally fixed to the tandem wheel housing and some of which are rotationally fixed to either the input shaft of the at least one of the first wheel end assembly or the second wheel end assembly.

3. The tandem wheel assembly of claim 2, wherein the tandem wheel housing includes a wheel end housing fixedly attached to an outboard wall thereof, the output shaft extending through an opening in the outboard wall.

4. The tandem wheel assembly of claim 3, wherein the wheel end gear train includes a planetary gear set having a sun gear coupled to the input shaft for rotation therewith, a plurality of planet gears mounted within a planet carrier, and a ring gear coupled to the planet gears and fixed to the tandem wheel housing, wherein the output shaft is coupled for rotation with the planet carrier.

5. The tandem wheel assembly of claim 2, further including an actuator that causes the discs to engage or disengage.

6. The tandem wheel assembly of claim 5, wherein the actuator is a hydraulically driven piston.

7. The tandem wheel assembly of claim 6, wherein activation of the hydraulically driven piston is controlled by a controller, the controller is configured to control an electro-hydraulic control valve to control hydraulic pressure to the hydraulically driven piston.

8. The tandem wheel assembly of claim 2, wherein the wheel end gear train includes a planetary gear set having a sun gear coupled to the input shaft for rotation therewith, a plurality of planet gears mounted within a planet carrier, and a ring gear coupled to the planet gears and fixed to the tandem wheel housing, wherein the output shaft is coupled for rotation with the planet carrier.

9. The tandem wheel assembly of claim 1, wherein the wheel end gear train includes a planetary gear set having a sun gear coupled to the input shaft for rotation therewith, a plurality of planet gears mounted within a planet carrier, and a ring gear coupled to the planet gears and fixed to the tandem wheel housing, wherein the output shaft is coupled for rotation with the planet carrier.

10. The tandem wheel assembly of claim 1, wherein the center drive member is a sprocket, and each wheel end drive member is a sprocket; and
wherein each coupler is a chain.

11. The tandem wheel assembly of claim 1, wherein the tandem wheel housing includes an inboard wall, an outboard wall, and a cover fixedly attached to an exterior surface of the inboard wall thereof; and
wherein the input shaft extends through an opening in the inboard wall and the brake assembly is coupled to the input shaft and between the inboard wall and the cover.

12. The tandem wheel assembly of claim 1, wherein the tandem wheel housing includes a wheel end housing fixedly attached to an outboard wall thereof; and
wherein the output shaft extends through an opening in the outboard wall.

13. The tandem wheel assembly of claim 1,
wherein the brake assembly has a first plurality of discs, some of which are rotationally fixed to the tandem wheel housing and some of which are rotationally fixed to the input shaft of the first wheel end assembly; and
wherein the brake assembly has a second plurality of discs, some of which are rotationally fixed to the tandem wheel housing and some of which are rotationally fixed to the input shaft of the second wheel end assembly.

14. The tandem wheel assembly of claim 13, further comprising a first actuator for actuating the first plurality of discs, and a second actuator for actuating the second plurality of discs, wherein each actuator is a hydraulically driven piston and is controlled by a controller, and the controller is configured to control an electro-hydraulic control valve to control hydraulic pressure to each hydraulically driven piston.

15. A tandem wheel assembly for a work vehicle having a chassis and wheels, the tandem wheel assembly comprising:
a tandem wheel housing defining a center opening extending along a pivot axis and wheel end openings extending along associated wheel end axes, the tandem wheel housing being pivotally mounted to the chassis about the pivot axis, the pivot axis and the wheel end axes being parallel to each other, and each said wheel end axis being spaced longitudinally on opposite sides of the pivot axis, the tandem wheel housing having an exterior inboard wall configured to be closer to a fore-aft centerline of the work vehicle when mounted to the work vehicle, wherein the tandem wheel housing includes a cover fixedly attached to the exterior inboard wall thereof;
a center drive member disposed within the tandem wheel housing and rotatable with respect to the tandem wheel housing around the pivot axis;
first and second wheel end assemblies, each said wheel end assembly disposed at one of the wheel end openings, each said wheel end assembly including:

an input shaft mounted for rotation within the tandem wheel housing and extending through an opening in the exterior inboard wall,
a wheel end drive member mounted on the input shaft for rotation therewith,
a wheel end gear train coupled to the input shaft,
an output shaft coupled to the wheel end gear train and rotatable along the wheel end axis, and
a wheel end hub coupled to the output shaft for supporting one of the wheels;
a coupler between each wheel end drive member and the center drive member, wherein each wheel end drive member is driven by the center drive member; and
a brake assembly coupled to the tandem wheel housing and to the input shaft of at least one of the first wheel end assembly or the second wheel end assembly, the brake assembly being mounted to the input shaft between the exterior inboard wall and the cover.

16. The tandem wheel assembly of claim 15, wherein the brake assembly has a plurality of discs, some of which are rotationally fixed to the tandem wheel housing and some of which are rotationally fixed to the input shaft of the at least one of the first wheel end assembly or the second wheel end assembly; and wherein the brake assembly includes:
a hydraulic actuator that causes the discs to engage or disengage; and
a controller configured to control activation of the hydraulic actuator.

17. The tandem wheel assembly of claim 15, wherein the tandem wheel housing includes a wheel end housing fixedly attached to an outboard wall thereof; and
wherein the output shaft extends through an opening in the outboard wall.

18. The tandem wheel assembly of claim 15, wherein the brake assembly has a first plurality of discs, some of which are rotationally fixed to the tandem wheel housing and some of which are rotationally fixed to the input shaft of the first wheel end assembly; and
wherein the brake assembly has a second plurality of discs, some of which are rotationally fixed to the tandem wheel housing and some of which are rotationally fixed to the input shaft of the second wheel end assembly.

\* \* \* \* \*